US012154130B2

(12) United States Patent
Sheppard et al.

(10) Patent No.: US 12,154,130 B2
(45) Date of Patent: Nov. 26, 2024

(54) METHODS AND APPARATUS TO ESTIMATE UNIQUE AUDIENCE SIZES ACROSS MULTIPLE INTERSECTING PLATFORMS

(71) Applicant: The Nielsen Company (US), LLC, New York, NY (US)

(72) Inventors: Michael Richard Sheppard, Holland, MI (US); Jonathan Sullivan, Hurricane, UT (US); Edward Murphy, North Stonington, CT (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/525,674

(22) Filed: Nov. 12, 2021

(65) Prior Publication Data

US 2022/0156783 A1    May 19, 2022

Related U.S. Application Data

(60) Provisional application No. 63/113,629, filed on Nov. 13, 2020.

(51) Int. Cl.
*G06Q 30/0242* (2023.01)
*G06F 17/18* (2006.01)

(52) U.S. Cl.
CPC ......... *G06Q 30/0243* (2013.01); *G06F 17/18* (2013.01)

(58) Field of Classification Search
CPC .......... G06Q 30/0243; G06Q 30/0201; G06Q 50/01; G06F 17/18; H04L 9/0825; H04L 9/0643; H04L 2209/46; H04L 9/085; H04L 2209/08; H04L 9/008
See application file for complete search history.

(56) References Cited

U.S. PATENT DOCUMENTS

| 11,039,190 B1 | 6/2021 | Dailey et al. |
| 11,216,588 B1* | 1/2022 | An ..................... G06F 21/6227 |
| 2004/0243517 A1* | 12/2004 | Hansen ............... G06Q 20/382 705/64 |
| 2014/0025959 A1* | 1/2014 | Dittrich ................ H04L 9/0894 713/189 |

(Continued)

FOREIGN PATENT DOCUMENTS

WO    WO-2021162743 A1 *  8/2021  ......... G06F 16/2237

OTHER PUBLICATIONS

Tschorsch et al, "An Algorithm for privacy-preserving distributed user statistics", Computer Networks, vol. 57, Issue 14, Oct. 2013, pp. 2775-2787. (Year: 2013).*

(Continued)

*Primary Examiner* — Marie P Brady

(57) ABSTRACT

A disclosed example includes: at least one memory; instructions; and processor circuitry to execute the instructions to at least: determine a first sum of estimated individual cardinalities of audience members of first and second media platforms; determine a second sum of estimated pairwise cardinalities of ones of the audience members belonging to both the first and second media platforms; and generate lower and upper bound estimates of a deduplicated audience size based on the first and second sums; and send the deduplicated audience size to a computing device via a network communication.

19 Claims, 15 Drawing Sheets

(56) References Cited

U.S. PATENT DOCUMENTS

| | | | |
|---|---|---|---|
| 2016/0092699 A1* | 3/2016 | Riva | H04L 63/0421 726/26 |
| 2017/0155956 A1 | 6/2017 | Nagaraja Rao et al. | |
| 2017/0357820 A1* | 12/2017 | Sierra | H04L 63/0421 |
| 2018/0349620 A1* | 12/2018 | Bhowmick | G06F 21/606 |
| 2021/0359701 A1* | 11/2021 | Lacey | G06F 13/1668 |
| 2021/0359846 A1* | 11/2021 | Wright | H04L 9/0643 |
| 2023/0144763 A1* | 5/2023 | Peng | G06F 16/2237 707/692 |

OTHER PUBLICATIONS

C. Dong and G. Loukides, "Approximating Private Set Union/Intersection Cardinality With Logarithmic Complexity," in IEEE Transactions on Information Forensics and Security, vol. 12, No. 11, pp. 2792-2806, Nov. 2017, doi: 10.1109/TIFS.2017.2721360. (Year: 2017).*

R. Stanojevic, M. Nabeel and T. Yu, "Distributed Cardinality Estimation of Set Operations with Differential Privacy," 2017 IEEE Symposium on Privacy-Aware Computing (PAC), Washington, DC, USA, 2017, pp. 37-48, doi: 10.1109/PAC.2017.43. (Year: 2017).*

Clifford, Peter, and Ioana A. Cosma. "A statistical analysis of probabilistic counting algorithms." Scandinavian Journal of Statistics 39.1 (2012): 1-14 (Year: 2010).*

Mor, Nitesh, et al. "Bloom Cookies: Web Search Personalization without User Tracking." NDSS. 2015 (Year: 2015).*

Dawson et al., "An Inequality for Probabilities," Proceedings of the American Mathematical Society, vol. 18, No. 3, Jun. 1967, 4 pages.

Yang et al., "Lower Bounds on the Probability of a Finite Union of Events," arXiv:1401.5543v5 [math.PR], Feb. 1, 2019, 16 pages.

Kwerel, "Most Stringent Bounds on Aggregated Probabilities of Partially Specified Dependent Probability Systems," Journal of the American Statistical Association, vol. 70, No. 350, Jun. 1975, pp. 472-479.

Hunter, "An Upper Bound for the Probability of a Union," Journal of Applied Probability, vol. 13, No. 3, Sep. 1976, pp. 597-603.

Worsley, "An Improved Bonferroni Inequality and Applications," Biometrika, vol. 69, No. 2, Aug. 1982, pp. 297-302.

businesswire.com, "The Trade Desk Adds Nielsen to Unified ID 2.0 Initiative as Advertisers Seek Upgrade to Cookies," Nov. 2, 2020, retrieved on Apr. 25, 2023, retrieved from https://www.businesswire.com/news/home/20201102005296/en/Trade-Desk-Adds-Nielsen-Unified-ID-2.0, 2 pages.

* cited by examiner

METHODS AND APPARATUS TO ESTIMATE UNIQUE AUDIENCE SIZES ACROSS MULTIPLE INTERSECTING PLATFORMS

RELATED APPLICATION

This patent arises from an application claiming the benefit of U.S. Provisional Patent Application No. 63/113,629, filed Nov. 13, 2020, which is hereby incorporated herein by reference in its entirety. Priority to U.S. Patent Application No. 63/113,629 is hereby claimed.

FIELD OF THE DISCLOSURE

This disclosure relates generally to computer-based audience measurement and, more particularly, to methods and apparatus to estimate unique audience sizes across multiple intersecting platforms.

BACKGROUND

Tracking user access to digital media has been used by broadcasters and advertisers to determine viewership information for the digital media. Digital media is also known as Internet-accessible media. Tracking viewership of digital media can present useful information to broadcasters and advertisers when determining placement strategies for digital advertising. The success of advertisement placement strategies is dependent on the accuracy that technology can achieve in generating audience metrics.

Figure 1:
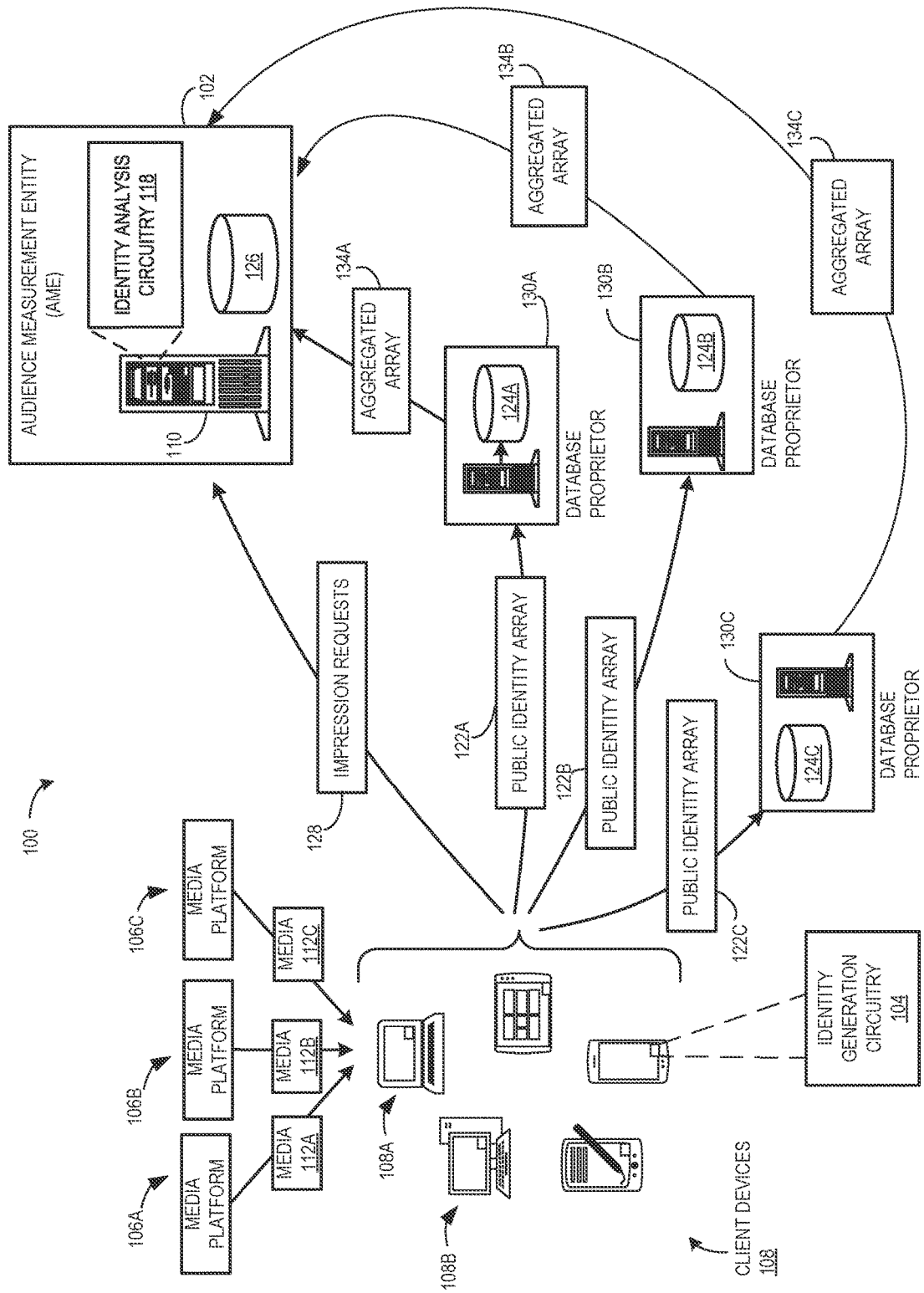
FIG. 1 is an example system for logging impressions of media accessed via client devices.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media, digital advertisement ratings (DAR), and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population or audience members (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporarily available online after broadcast, TV media, etc.). For example, a user may start watching a particular television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is used to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. As used herein, an audience size (e.g., a unique audience size), also called an audience cardinality, is a quantity of unique audience members of particular events (e.g., exposed to particular media, etc.). That is, an audience size is a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once when determining the audience size for that media item. In this manner, impression performance for particular media is not disproportionately represented when a small subset of one or more audience members is exposed to the same media a large number of times while a larger number of audience members is exposed fewer times or not at all to that same media. Audience size may also be referred to as a unique audience, a deduplicated audience, or an audience cardinality. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described techniques to track media accesses and to leverage demographic information from third-party database proprietors, use of third-party cookies may be limited or unavailable in some or all online markets. That is, use of third-party cookies enables sharing anonymous subscriber information (without revealing personally identifiable information (PII)) across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This makes it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets are generated.

An AME can generate estimates of unique audience sizes of media programs and advertising. Although media panels are effective at measuring media content and advertisements with large audiences—like those typically observed on TV and Radio—digital media audiences are difficult to measure with panels since fragmentation, addressable advertising and content recommendations, and generally more media options lead to smaller audience sizes distributed. The industry has attempted to solve this problem through cross-site tracking technologies like cookies and Advertiser Identifiers, which associate media impressions with persistent identifiers that represent devices owned by audience members. Unfortunately, cross-site tracking technologies—specifically identifiers (e.g., third-party cookies) that are broadly accessible without express user action—can be used to invade a user's privacy by tracking their behavior (e.g., websites they visit). Accordingly, some digital device OEMs and browser manufacturers are restricting or eliminating these technologies/IDs. Examples disclosed herein use an ID that can be used by an AME to calculate unique audiences without providing utility for cross-site tracking, thereby addressing privacy concerns impacting the historical IDs used for measurement.

In Digital Ad Ratings and other census-based measurement products, AMEs have historically relied on longitudinal identifiers (cookies, device IDs, mobile ad IDs, hashed emails, etc). These identifiers allow for tracking a person across sites and apps, which is useful for estimating unique audience across sites and apps. However, they also create a significant privacy hole, allowing for users to be tracked across the web and app ecosystems. Recently, these longitudinal identifiers have come under fire from the Google Chrome web browser (e.g., third-party cookies) and by Apple Inc. (e.g., all longitudinal identifiers on iOS).

FIG. 1 is an example system for logging impressions of media accessed via client devices. FIG. 1 includes an example operating environment 100 that includes an example audience measurement entity (AME) 102, example identity generation circuitry 104, an example first media platform 106A, an example second media platform 106B, an example third media platform 106C, example client devices 108 (which include an example first client device 108A and an example second client device 108B), an example AME server 110, example first media 112A, example second media 112B, example third media 112C, example identity analysis circuitry 118, an example first public identity array 122A, an example second public identity array 122B, an example third public identity array 122C, an example first database 124A, an example second database 124B, an example third database 124C, an example AME database 126, example impression requests 128, an example first database proprietor 130A, an example second database proprietor 130B, an example third database proprietor 130C, an example first aggregated array 134A, an example second aggregated array 134B, and an example third aggregated array 134C.

The example AME 102 includes the example AME server 110 that implements the example identity analysis circuitry 118 to estimate total unique audience sizes based on third-party aggregate subscriber-based audience metrics information provided by the database proprietors 130A-130C. In examples disclosed herein, the AME 102 may estimate a true audience cardinality (e.g., a count of unique audience members) across one or more of the database proprietors 130A-C. In the illustrated example of FIG. 1, the client devices 108 may be stationary or portable computers, handheld computing devices, smart phones, Internet appliances, and/or any other type of device that may be connected to the Internet and capable of presenting media.

The illustrated example of FIG. 1 includes the impression requests 128. However, in examples disclosed herein, communication between the client devices 108 and the AME 102 may be optional. For example, the client devices 108 may generate public identity arrays 122A-C and send the public identity arrays 122A-C to the database proprietors 130A-C without directly sending data to the AME 102. Additionally, or alternatively, the client devices 108 may send public identity arrays and/or impression requests to the AME 102. In some examples the AME 102 may implement an impression monitoring system to log media impressions and/or the media impression requests 128 reported by the client devices 108.

As used herein, a true audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once, multiple times, or if the particular person is sending impression requests related to the media item to a plurality of database proprietors, the person is only counted once in the audience size for the media item(s). Such a true audience size may also be referred to as unique audience, a deduplicated audience, or a true audience cardinality. As used herein, cardinality refers to the number of elements in a set (e.g., number of audience members) as a property of the set (e.g., the audience). For example, an audience consisting of one thousand unique individuals has a cardinality of one thousand.

As used herein, a media impression is defined as an occurrence of access and/or exposure to media, such as the media 112A-C (e.g., an advertisement, a movie, a movie trailer, a song, a web page banner, a webpage, etc.). Examples disclosed herein may be used to monitor for media impressions of any one or more media types (e.g., video, audio, a webpage, an image, text, etc.). In examples disclosed herein, the media 114A-C may be content and/or advertisements. Examples disclosed herein are not restricted for use with any particular type of media. On the contrary, examples disclosed herein may be implemented in connection with tracking impressions for media of any type or form.

In the illustrated example of FIG. 1, the database proprietor 130A, the database proprietor 130B, and the database proprietor 130C all receive different public identity arrays from the example first client device 108A. The example first client device 108A, the example second client device 108B, and more generally each of the client devices 108, are associated with a private identity array. Each example client device may generate any number of public identity arrays from a single private identity array. The generation may be based on a probabilistic bit flipping of respective private identity arrays of the client devices 108A and 108B.

For example, the public identity arrays 122A and 122B may be generated by the first client device 108A, and the public identity array 122C may be generated by the second client device 108B. Examples disclosed herein allow the AME 102 to generate an estimate of a deduplicated audience cardinality based on aggregated arrays 134A-C from one or more of the database proprietors 130A-C. Although only the public identity array 122A, the public identity array 122B, and the public identity array 122C are shown, there may be any number of public identity arrays sent to the database proprietors 130A-130C. For example, the first client device 108A may include a plurality of applications, ones of the plurality of applications to generate a plurality of public identity arrays upon access to the example media 112A and the media 112B. The example plurality of applications may be software programs (e.g., mobile apps) developed to operate on devices such as the example first client device 108A. In some examples, the plurality of applications may be mobile applications (e.g., streaming media apps, social media apps, news apps, weather apps, game apps, etc.) installed on the example first client device 108A to access media.

In the illustrated example of FIG. 1, the media platforms 106A-C, content providers, and/or advertisers distribute the media 112A-C via the Internet to users that access websites and/or online television services (e.g., web-based TV, Internet protocol TV (IPTV), etc.). In some examples, the media 112A-C is served by media servers of the same internet domains as the database proprietors 130A-C. For example, the database proprietor 130A is associated with the media platform 106A that can serve media 112A to the client device 108A. Examples disclosed herein can be used to generate audience metrics data that measures a deduplicated audience size of media served by one or more media platforms, database proprietors, and/or any other entities. For example, the database proprietors 130A-C may use such audience metrics data provided by the example audience measurement entity 102 to promote online media serving services (e.g., ad server services, media server services, etc.) to prospective clients. By showing audience metrics data indicative of a deduplicated audience size drawn by the example database proprietors 130A-C, the database proprietors 130A-C can sell media serving services to customers interested in delivering online media to users.

The media 112A-C is presented via the client devices 108. When the media 112A-C is accessed by the client devices 108, the client devices 108 send impression requests including public identity arrays 122A-122C to the database proprietors 130A-C to inform the database proprietors 130A-C of the media accesses. In this manner, the database proprietors 130A-C can log media impressions in impression records of the databases 124A-C. In the illustrated example of FIG. 1, the example database proprietors 130A-C do not have access to the public identity arrays of other database proprietors. For example, the database proprietor 130A of the illustrated example of FIG. 1 does not have access to the public identity array 122B.

In some examples, the client devices 108 also send impression requests and/or public identity arrays to the AME 102 so that the AME 102 can log census impressions in an AME database 126. In some examples, the database proprietors 130A-C additionally log demographic impressions corresponding to example public identity arrays. For example, the public identity array 122A, indicative of an access by the client devices 108A to the media 112A, may be used to identify subscriber accounts and retrieve demographic information from subscriber account records. Demographic impressions are impressions logged in association with demographic information collected by the database proprietors 130A-130C from registered subscribers of its services. In some examples, the AME server 110 logs census-level media impressions corresponding to accesses by the client devices 108 to the media 112A-C. Census-level media impressions (e.g., census impressions) are impressions logged regardless of whether any public identity array and/or other demographic information is known for those logged impressions.

In some examples, the media 112A-C is encoded to include a media identifier (ID). The media ID may be any identifier or information that can be used to identify the corresponding media 112A-C. In some examples the media ID is an alphanumeric string or value. In some examples, the media ID is a collection of information. For example, if the media 112A is an episode, the media ID may include a program name, a season number, and an episode number. The example media 112A may include advertisements. The advertisements may be individual, standalone advertisements and/or may be part of one or more ad campaigns. The advertisements of the illustrated example may be encoded with identification codes (e.g., data) that identify the associated ad campaign (e.g., a campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 112A-C of FIG. 1 are tagged or encoded to include monitoring or tag instructions, which are computer executable monitoring instructions (e.g., Java, java script, or any other computer language or script) that are executed by web browsers that access the media 112A-C via, for example, the Internet. Execution of the monitoring instructions causes the web browser to generate, by identity generation circuitry, a public identity array, the public identity array sent to one or more specified servers of the AME 102 and/or the database proprietors 130A-C. In some examples, the public identity arrays 130A-C may be accompanied by user-identifying data (e.g., demographic information) that the database proprietors 130A-C can use to identify a characteristic of the user that accessed the media without being able to identify the specific user. For example, when a subscriber of the database proprietor 130A logs into a server of the media platform 106A (e.g., a server associated with the database proprietor 130A) via a client device 108A, the media platform 106A of the database proprietor 130A can send monitoring instructions to the client device 108A. In such examples, the monitoring instructions cause the client device 108A to send at least a public identity array to the database proprietor 130A.

In some examples, subscriber identity and/or subscriber account information including personally identifiable information (PII) such as full name, street address, residence city and state, telephone numbers, email addresses, ages, dates of birth, social security numbers, demographic information, and/or any other personal information may be provided to the database proprietors 130A-C by subscribers in exchange for services from the database proprietors 130A-C. In some examples, database proprietor cookies of the client devices 108 may inform the database proprietor 130A of particular subscribers that accessed the example media 112A, without transmitting information to the AME 102. For example, by having such PII information mapped to database proprietor cookies, the example database proprietor 130A can subsequently identify the subscriber based on the database proprietor cookie to determine when that user accessed media 112A and to log an impression in association with a public identity array, demographic information, and/or other PII information of that user. For example, the PII including the public identity array 122A may be transmitted to the database proprietor 130A that stores the PII and the public identity array in the example database 124A. The database proprietor 130A may collect a plurality of public identity arrays associated with access to the media platform 106A and/or the media 112A, aggregate the plurality of public identity arrays to generate the aggregated array 134A, and send the aggregated array 134 to the AME 102 without sending the PII. In some examples, the AME 102 may also set AME cookies in the client devices 108 to identify users that are enrolled in a panel of the AME 102 such that the AME 102 collects PII information of people that enroll in the panel by agreeing to having their internet activities monitored by the AME 102.

The sending of impression requests including public identity arrays 122A-C may be implemented using HTTP requests. However, whereas HTTP requests are network communications that traditionally identify web pages or other resources to be downloaded, the impression requests including the public identity arrays 122A-C of the illustrated example are network communications that further include audience measurement information (e.g., ad campaign identification, content identifier, and/or user identification information) in their payloads. The server (e.g., the AME server 110 and/or the database proprietors 130A-C) to which the impression requests are directed is programmed to log occurrences of impressions and store public identity arrays information. Further examples of monitoring instructions (e.g., beacon instructions) and uses thereof to collect impression data are disclosed in U.S. Pat. No. 8,370,489 entitled "Methods and Apparatus to Determine Impressions using Distributed Demographic Information," which is hereby incorporated herein by reference in its entirety.

In other examples, in which the media 112A-C is accessed by apps (e.g., on mobile devices, tablets, computers, etc.) that do not employ cookies and/or do not execute instructions in a web browser environment, an app publisher (e.g., an app store) can provide a data collector in an install package of an app for installation at the client devices 108. When the example client devices 108 download the app and consent to the accompanying data collector being installed at the client devices 108 for purposes of audience/media/data analytics, the data collector can detect when the media 112A-C is accessed at the client devices 108 and cause the client devices 108 to send one or more impression requests including public identity arrays 122A-C and/or other PII to report the access to the media 112A-C. In such examples, the data collector can obtain the public identity array, user identifiers and/or device identifiers stored in the client devices 108 and send them to the database proprietors 130A-C and/or the AME 102 to enable the database proprietor 130A-C and/or the AME 102 to log impressions. Further examples of using a collector in client devices to collect impression data are disclosed in U.S. Pat. No. 8,930,701 entitled "Methods and Apparatus to Collect Distributed User Information for Media Impressions and Search Terms," and in U.S. Pat. No. 9,237,138 entitled "Methods and Apparatus to Collect Distributed User Information for Media Impressions and Search Terms," both of which are hereby incorporated herein by reference in their entireties.

In the illustrated example, the database proprietors 130A-C collaborate with the AME 102 so that the AME 102 can operate as an independent party that measures and/or verifies audience measurement information pertaining to the media 112A-C accessed by the subscribers of the database proprietors 130A-C. However, the database proprietor 130A-C does so while protecting the privacies of its subscribers by not sharing or revealing subscriber identities, subscriber information, and/or any other subscriber PII information to outside parties. In examples disclosed herein, to share impression data with the AME 102 without revealing subscriber identities, subscriber information, and/or any other subscriber PII information, the database proprietor 130A-C processes its collected subscriber-level audience metrics information to generate third-party aggregate subscriber-based audience metrics information. In the example of FIG. 1, third-party aggregate subscriber-based audience metrics information is shown as example aggregated arrays 134A-C. The example aggregated arrays 134A-C include aggregate public identity information of the respective database proprietors 134A-C. The example aggregated arrays 134A-C may include impression counts in the aggregate (e.g., no user-identifying PII data) per demographic category, for one or more media items of interest. The example aggregated arrays 134A-C may include audience sizes in the aggregate (e.g., no user-identifying PII data) per demographic category for one or more media items of interest.

Figure 2:
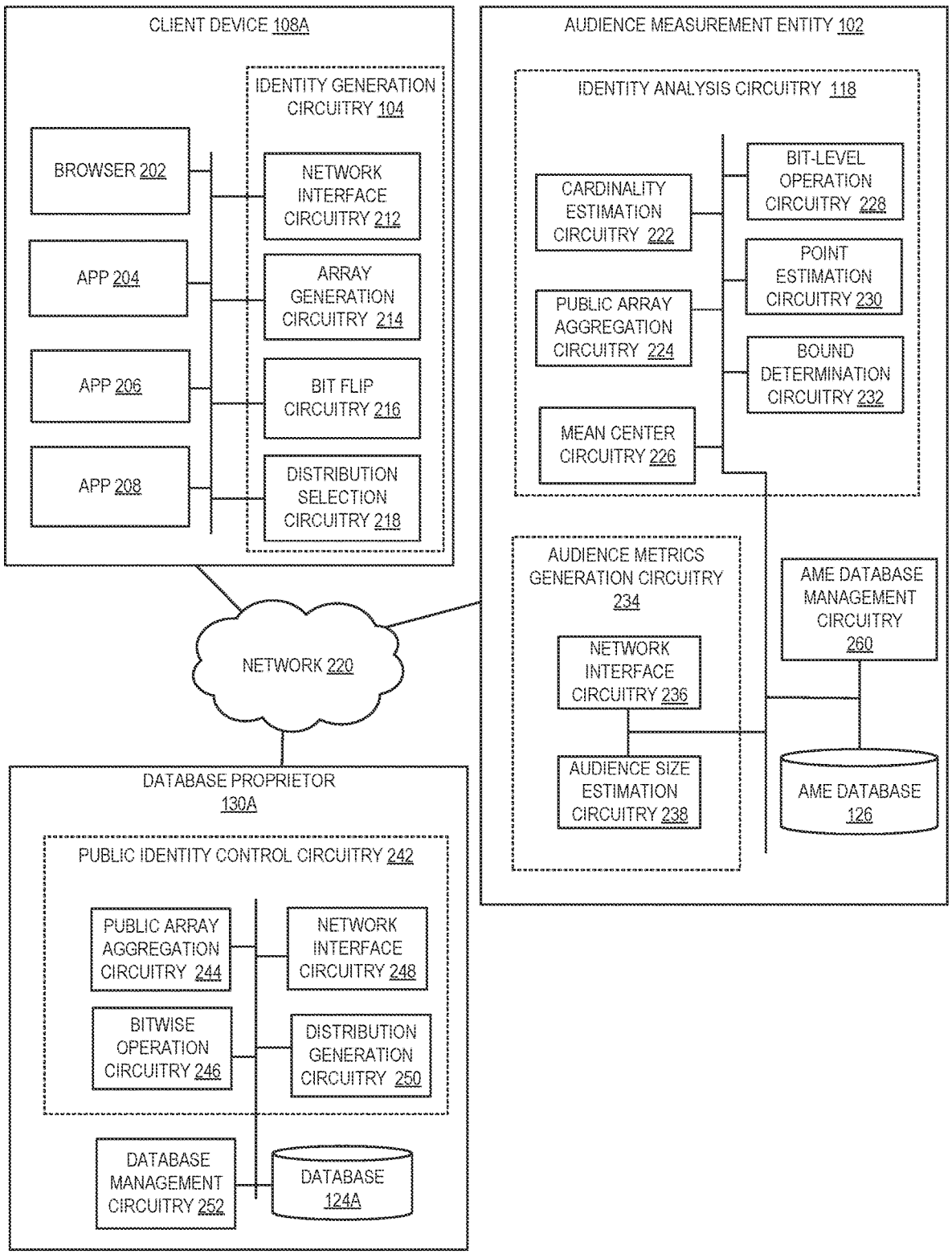
FIG. 2 is a block diagram of an example implementation of the example system of FIG. 1 for logging impressions of media accessed by client devices.

Before turning to FIG. 2, the following discussion is provided for the interested reader regarding the development of examples disclosed herein. However, examples disclosed herein are not limited to this manner of development, and use of examples disclosed herein is not dependent on any particular manner of development of such disclosed examples.

In one example, a number of unique users, A, are members of n platforms associated with database proprietors (e.g., database proprietors 130A-C). As described above, membership can be defined as visiting a website, owning a cellphone app, etc. For each user, a public identity array (e.g., a noisy array) is generated, and the public identity array is sent to the database proprietors for aggregations.

Each of the A unique users has a private identity array of length m, where all $2^m$ bit combinations are equally likely to be generated. If A is the unknown true audience of a media item, m can be chosen large enough such that the probability of a hash collision is significantly reduced and/or negligible. As used herein, a hash collision occurs when two distinct client devices and/or two distinct applications generate the same public identity from two separate bit-flipping processes. A public identity array can be generated by probabilistic bit-flipping of the private array (e.g., introducing bit-flipping noise). Therefore, a single user may give different noisy arrays to one or more database proprietors.

For a random user, Equation 1 below illustrates an arbitrary element b of a corresponding private array. If Z is an indicator variable for bit-flipping, a corresponding public bit is expressed in Equation 2 below. When $Z=0$, $\tilde{b}=b$, and when $Z=1$, $\tilde{b}=1-b$. As $b=\{0,1\}$, $Z=1$ corresponds to flipping a bit to an opposite value (e.g., flipping 0 to 1). The distribution of Z is a Bernoulli random variable for a bit flipping probability p, according to Equation 3.

$$b \sim \text{Bernoulli}(\tfrac{1}{2}) \qquad \text{Equation 1}$$

$$\tilde{b}=b(1-Z)+(1-b)Z \qquad \text{Equation 2}$$

$$Z \sim \text{Bernoulli}(p) \qquad \text{Equation 3}$$

If $p=\tfrac{1}{4}$, for example, then every bit will be flipped with 25% probability. If p is a random variable with distribution R, whose domain is contained within the closed interval [0, 1], then Equations 4 show:

$$E(\tilde{b})=\tfrac{1}{2} \quad \text{Var}(\tilde{b})=\tfrac{1}{4} \qquad \text{Equations 4}$$

Both of Equations 4 are independent of the distribution R. Equations 5 below are based on $A_i$ users and $X_i = \Sigma \tilde{b}$. Assuming a user is a member of two platforms (e.g., two of the media platforms 106A-C of FIG. 1), i and j, where platform i is represented as 1 and platform j is represented as 2, and with a noisy bit for each platform determined by two random processes that are probabilistic bit-flipping of the original private bit value, then we have Equations 6 below. The two platforms, i and j, may be the media platforms 106A and 106B shown in FIG. 1. Equations 6 yield the covariance of Equation 7 below. For any arbitrary labeling of the two platforms, i and j, if there are $A_{ij}$ such users, by independence, Equation 8 below follows.

$$E(X_i) = \left(\frac{1}{2}\right)A_i \quad \text{Var}(X_i) = \left(\frac{1}{4}\right)A_i \quad \text{Equation 5}$$

$$p_1 \sim R_1 \quad | \quad p_2 \sim R_2 \quad \text{Equations 6}$$

$$Z_1 \sim \text{Bernoulli}(p_1) \quad | \quad Z_2 \sim \text{Bernoulli}(p_2)$$

$$\tilde{b}_1 = b(1 - Z_1) + (1 - b)Z_1 \quad | \quad \tilde{b}_2 = b(1 - Z_1) + (1 - b)Z_2$$

$$\text{Cov}(\tilde{b}_1, \tilde{b}_2) = \frac{1}{4}(1 - 2E(R_1))(1 - 2E(R_2)) \quad \text{Equation 7}$$

$$\text{Cov}(X_i, X_j) = \frac{1}{4}(1 - 2E(R_i))(1 - 2E(R_j))A_{ij} \quad \text{Equation 8}$$

For large enough cardinalities, by central limit theorem, a true joint distribution $X=(X_1, \ldots, X_n)^T$ as a multivariate normal can be estimated, leading to Equations 9 below.

$$X \sim N(\mu, \Sigma) \quad \text{Equations 9}$$

$$[\mu]_i = \left(\frac{1}{2}\right)A_i$$

$$[\Sigma]_{ij} = \begin{cases} \left(\frac{1}{4}\right)A_i & i = j \\ \frac{1}{4}(1 - 2E(R_i))(1 - 2E(R_j))A_{ij} & \text{otherwise} \end{cases}$$

Then, if the length of the array is m, m independent and identically distributed random variables from a distribution can be used as inference. Inference on $A_{ij}$ is facilitated as long as neither $E(R_i)$ nor $E(R_j)$ equals ½. Therefore, if $E(R_i)=E(R_j)=c$ and c does not equal ½ for all pairs of platforms, then a constant of proportionality for $A_{ij}$ is independent of indices.

$R_i$ and $R_j$ have expected values equal to c, which can be assumed to have a value c<½ because if c is greater than ½ it is similar to deterministically changing the labels of 0 and 1 and performing a bit-flipping with a complementary probability. Typical distributions bounded on a possible subset of [0, 1] and E(R)=c can be used, as shown in Equations 10.

$$R \sim \text{Beta}(\alpha, \beta) \text{ with } \frac{\alpha}{\alpha+\beta} = c \quad \text{Equations 10}$$

$$R \sim \text{Uniform}(0, 2c)$$

$$R \sim \text{Constant}(p = c)$$

The third Equation (R~Constant (p=c)) of Equations 10 is a constant distribution with a selected c. For a chosen platform i, the distribution $R_i$ produces a random value $p_i$, which is sent to the user for bit-flipping. A noisy array is returned to the platform i. In some examples, an example distribution for a private identity array can vary across a bit array and among users.

If $R_i$ is similar to $R_j$ for all platforms, a user device can generate a noise probability and produce a public array without having a probability sent from a database proprietor. In such a scenario, a database proprietor would not have information indicating what distribution was used or what random bit flipping probability was chosen. In such an example, a random bit flipping probability can vary across a bit array and from individual to individual. For example, c=¼ generates two independent random uniform variates, $U_1$ and $U_2$ on [0, 1] and assigning Z based on Equation 11 below.

$$Z = \begin{cases} 1 & U_1 \leq \frac{1}{2}U_2 \\ 0 & \text{otherwise} \end{cases} \quad \text{Equation 11}$$

Alternatively, Z can be a bit-wise product of two random bits, $b_1$ and $b_2$, with $Z=(b_1 b_2)$. This equals the value of 1 with probability ¼. An output bit can be expressed as bitwise operation according to Equations 12 below.

$$\tilde{b}_0 = b_0(1 - Z) + (1 - b_0)Z \quad \text{Equations 12}$$
$$= b_0(1 - (b_1 b_2)) + (1 - b_0)(b_1 b_2)$$
$$= b_0 - (b_0 b_1 b_2) + (b_1 b_2) - (b_0 b_1 b_2)$$

Each term and partial sum, in order, is either {0,1}. With c=¼, the covariance of a joint distribution simplifies to Equation 13 below.

$$[\Sigma]_{ij} = \begin{cases} \left(\frac{1}{4}\right)A_i & i = j \\ \left(\frac{1}{16}\right)A_{ij} & \text{otherwise} \end{cases} \quad \text{Equation 13}$$

If $v_1$ is a proportionality constant within a diagonal, and $v_2$ for an off-diagonal for a general c, then $v_1=¼$ and $v_2=(1-2c)^2$, yielding Equation 14 below. Dividing a corresponding entry in a sample covariance by an appropriate coefficient generates an estimate for $A_i$ and $A_{ij}$, shown in Equations 15 below.

$$[\Sigma]_{ij} = \begin{cases} (v_1)A_i & i = j \\ (v_2)A_{ij} & \text{otherwise} \end{cases} \quad \text{Equation 14}$$

$$\hat{A}_i = \frac{1}{v_1}[\hat{\Sigma}]_{ii} \quad \text{Equations 15}$$

$$\hat{A}_{ij} = \frac{1}{v_2}[\hat{\Sigma}]^{ij}$$

Additionally, or alternatively, $A_i$ and $A_{ij}$ can be individually estimated. In examples disclosed herein, taking X' as a zero meaned distribution of X does not impact a covariance matrix of the distribution, but does impact inference for $A_i$ in some circumstances.

$A_i$ can be used directly if given to the example AME 102. If $A_i$ is not given to the AME 102, an array from the $i^{th}$ database, $X_i$, can be estimated according to Equations 16-18 below.

$$\hat{A}_i = \begin{cases} A_i & \text{if given by platform} \quad \text{Equation 16} \\ 2\left(\sqrt{(x^2+v_1^2)} - v_1\right) & \text{if } X_i \sim N\left(\frac{1}{2}A_i, (v_1)A_i\right) \quad \text{Equation 17} \\ \left(\frac{1}{v_1}\right)(x')^2 & \text{if } X_i' \sim N(0, (v_1)A_i) \quad \text{Equation 18} \end{cases}$$

Equation 16 assumes $A_i$ is provided to the AME 102 by a database proprietor. Equation 17 occurs if a database proprietor provides a raw, non-zero-meaned array of sums to the AME 102. Equation 17 reflects a connection between an expected value and variance.

If a database proprietor returns the zero-meaned array of sums, Equation 18 is similar to the first-order estimate of Equation 15. Variance is greater in Equation 18 than in Equation 17. In turn, variance is greater in Equation 17 than in Equation 16.

If $A_i$ and $A_j$ are both known, then X' can be considered a bivariate normal distribution given by Equations 19 below.

$$X_{ij}' \sim N(\mu, \Sigma) \quad \text{Equations 19}$$

$$\mu = [0, 0]$$

$$\Sigma = \begin{bmatrix} v_1 A_i & v_2 A_{ij} \\ v_2 A_{ij} & v_1 A_j \end{bmatrix}$$

In some examples, x' represents an array from a first dimension and y' represents an array from a second dimension. Assuming $A_i$ and $A_j$ are fixed at estimated values, an estimate for $A_{ij}$ is a root raised to a cubic polynomial. Using $V_{xx}=(x')^2$, $V_{yy}=(y')^2$, $V_{xy}=(x')(y')$, an estimate of $A_{ij}$ is a root of a third-degree polynomial defined with a variable Was placeholder, $c_0 + c_1 W + c_2 W^2 + c_3 W^3 = 0$, with variables $c_0$ through $c_3$ defined according to Equations 20 below. Then, an estimate of $A_{ij}$ can be computed for all unique pairs of $\{i,j\}$.

$$c_0 = A_i A_j v_1^2 V_{xy}$$

$$c_1 = v_1 v_2 (A_i A_j v_1 - A_j V_{xx} - A_i V_{yy})$$

$$c_2 = v_2^2 V_{xy}$$

$$c_3 = -v_2^3 \quad \text{Equations 20}$$

Sums for $S_1$ and $S_2$ can be estimated according to Equations 21 below. However, $S_1$ and/or $S_2$ can also be estimated directly without estimating all pairs. If a joint distribution of X is a multivariate normal distribution with mean and covariance matrix according to Equations 22 below, then Equation 23 below is a scalar sum of elements of the n-dimensional random vector. Defining the distribution of Y as a univariate normal with mean and variance corresponds to Equations 24 below.

$$\hat{S}_1 = \sum_{i=1}^n \hat{A}_i \quad \text{Equations 21}$$

$$\hat{S}_2 = \sum_{1 \le i < j \le n} \hat{A}_{ij}$$

$$x \sim N(\mu, \Sigma) \quad \text{Equations 22}$$

$$[\mu]_i = \left(\frac{1}{2}\right) A_i$$

$$[\Sigma]_{ij} = \begin{cases} (v_1) A_i & i=j \\ (v_2) A_{ij} & \text{otherwise} \end{cases}$$

$$Y = \sum_{i=1}^n X_i \quad \text{Equation 23}$$

$$Y \sim N(\mu, \sigma^2) = N\left(\frac{1}{2} S_1, v_1 S_1 + 2 v_2 S_2\right) \quad \text{Equations 24}$$

A multiplier of 2 in the variance term of Equations 24 is because each off-diagonal of the covariance is counted twice in the linear combination, due to the symmetry of the covariance matrix. In turn, an estimate of both $S_1$ and $S_2$ can be given directly according to Equations 25 below.

$$\hat{S}_1 = 2\bar{y} \quad \text{Equations 25}$$

$$\hat{S}_2 = \left(\frac{1}{2v_2}\right)\left(\overline{y^2} - \frac{\hat{S}_1(\hat{S}_1 + 4v_1)}{4}\right)$$

Additionally, or alternatively, database proprietors may give the AME 102 zero-centered arrays of raw count arrays according to Equations 26 below.

$$Y' = \sum_{i=1}^n X_i' \quad \text{Equations 26}$$

$$Y' \sim N(0, v_1 S_1 + 2 v_2 S_2)$$

With Equations 26, $S_1$ is assumed known and need not be estimated. Taking that constraint into account, an estimate of $S_2$ is given according to Equation 27 below, providing an estimate of $S_2$ from a distribution of a sum of zero-meaned arrays and knowledge of $S_1$. If only a first-order needs to be given, both $S_1$ and $S_2$ can be estimated from a sample covariance, $\Sigma$ hat, according to Equations 28 below.

$$\hat{S}_2 = \frac{\overline{(y')^2} - v_1 S_1}{2 v_2} \quad \text{Equation 27}$$

$$\hat{S}_1 = \frac{1}{v_1} \sum_{i=1}^n [\hat{\Sigma}]_{ii} \quad \text{Equations 28}$$

$$\hat{S}_2 = \frac{1}{v_2} \sum_{1 \le i < j \le n} [\hat{\Sigma}]_{ij}$$

By the inclusion exclusion principle, a cardinality can be given according to Equations 30 below.

$$\left| \bigcup_{i=1}^n A_i \right| = S_1 - S_2 + S_3 - S_4 + \cdots + (-1)^{(n-1)} S_n \quad \text{Equations 30}$$

$$S_1 = \sum_{i=1}^n |A_i|$$

$$S_2 = \sum_{1 \le i_1 < i_2 \le n} |A_{i1} \cap A_{i2}|$$

$$\vdots$$

$$S_k = \sum_{1 \le i_1 < \cdots < i_k \le n} |A_{i1} \cap \ldots \cap A_{ik}|$$

Bonferonni inequalities are made by truncating the sum to a partial sum which turns the equality into an inequality with alternating signs. Truncating after the first and second terms, respectively, produces a first order bound $S_1 - S_2 \leq |A_1 \cup \ldots \cup A_n| \leq S_1$.

Treating cardinalities as proportions of a population, bounds on a total cardinality of a union is equivalent to establishing bounds on the probability $Pr(A_1 \cup \ldots \cup A_n)$ in terms of only individual event probabilities $Pr(A_i)$'s and pairwise event probabilities $Pr(A_i \cup A_j)$'s. As described herein, $p_{ij} = Pr(A_i \cup A_j)$ for $i \neq j$, and $p_{ii} = p_i = Pr(A_i)$.

Improvements to Bonferonni bounds are based on information of $\{S_1, S_2\}$, but use improved logic to create tighter bounds. Use of individual information of $\{p_i\}$ and $\{p_{ij}\}$ produces an even tighter bounds. In general, lower-bounds (LB) and upper-bounds (UB) described herein follow the inequality $LB \leq Pr(A_1 \cup \ldots \cup A_n) \leq UB$.

Example bounds and inequalities are linear, therefore similar formulas apply directly to using unnormalized values of cardinality estimates themselves instead of proportions of the population. Examples to solve for LB and UB are provided below in Equations 30-33.

$$LB = \frac{2}{h+1} S_1 - \frac{2}{h(h+1)} S_2 \quad \text{Equations 30}$$

$$h = 1 + \left\lfloor \frac{2S_2}{S_1} \right\rfloor$$

$$LB = \delta + \sum_{i=1}^{n} \left\{ \left[ \frac{1}{x(r_i)} - \frac{r_i - x(r_i)}{[1 + x(r_i)][x(r_i)]} \right] a_i' \right\} \quad \text{Equations 31}$$

$$\delta = \left\{ \max_i [\gamma_i - (n-1)\alpha_i] \right\}^+ \geq 0$$

$$r_i = \frac{\gamma_i'}{\alpha_i'}$$

$$\alpha_i' = \alpha_i - \delta$$

$$\alpha_i = p_i$$

$$\gamma_i = \sum_{j=1}^{n} p_{ij}$$

$$UB = S_1 - \frac{2}{n} S_2 \quad \text{Equation 32}$$

$$UB\left( \sum_{i=1}^{m} p_i \right) - \max_{T \in \mathcal{J}} \sum_{(i,j) \in T} p_{ij} \quad \text{Equation 33}$$

In Equation 33, the maximization is taken over the set T of all spanning trees of a complete graph on a vertex set V where $p_{ij}$ is a weight of the edge connecting nodes i and J.

For example, assume the AME 102 has retrieved aggregated public arrays from n=4 platforms. The aggregated arrays have some length m. A sample covariance from the data can be calculated according to Equation 34 below.

$$\hat{\Sigma} = \begin{bmatrix} 1404.500 & 246.563 & 6.875 & 124.500 \\ 246.563 & 10672.800 & 39.000 & 769.313 \\ 6.875 & 39.000 & 4496.750 & 22.125 \\ 124.500 & 769.313 & 22.125 & 7909.500 \end{bmatrix} \quad \text{Equation 34}$$

Assuming $v_1 = 1$ and $v_2 = 1/16$, individual entries can be divided to give an estimate of either the individual cardinalities (diagonal, divided with $v_1$), or intersections (off-diagonal, divided with $v_2$). For clarity, due to symmetry, only half the estimates are shown in Equation 35 below. This results in values of $S_1$ and $S_2$ as shown in Equations 36 below.

$$[A]_{ij}^- = \begin{bmatrix} 5{,}618 & 3{,}945 & 110 & 1992 \\ - & 42{,}691 & 624 & 12{,}309 \\ - & - & 17{,}987 & 354 \\ - & - & - & 31{,}638 \end{bmatrix} \quad \text{Equation 35}$$

$$S_1 = 5{,}618 + 42{,}691 + 17{,}987 + 31{,}638 = 97{,}934 \quad \text{Equations 36}$$

$$S_2 = 3{,}945 + 110 + 1{,}992 + 624 + 12{,}309 + 354 = 19{,}334$$

$$n = 4$$

Equations 30-33 can lead to a LB estimate of 78,600 and an UB estimate of 88,267 for $S_1$ and $S_2$. Equations 30-33 lead to a LB estimate of 78,600 and an UB estimate of 88,267 for $p_i$ and $p_{ij}$. Determining bounds using a full enumeration of $2^n$ terms and using linear programming subject to known constraints leads to a LB 78,600 and an UB 88,267 for $S_1$ and $S_2$. The full enumeration leads to a LB estimate of 79,059 and an UB estimate of 81,056 for $p_i$ and $p_{ij}$. For comparison, the true exact value of the cardinality was 80,447.

To calculate a point estimate, if high precision is not needed, a mid-point between the lower and upper bounds of any of the methods given above can be used. Another method can include a weighted average of the Lower Bound (LB) and Upper Bound (UB) according to Equation 37 below.

$$\left| \bigcup_{i=1}^{n} A_i \right| \approx (1-w)(LB) + (w)(UB) \quad \text{Equation 37}$$

For simplicity, in some examples, only known values of $S_1$ and $S_2$ are used for the point estimate. As described below in accordance with point estimation, $p_i$ is defined as a probability of being in $i = \{0, \ldots, n\}$ set-memberships. For any i, there are $\binom{n}{i}$ combinations which make up a respective $p_i$, and the respective $p_i$ is also a member of $$\binom{i}{2}$$

pairwise intersections. Due to symmetry of $S_1$ and $S_2$ each constraint can be written compactly, as illustrated below in Equations 38-40. In the below Equations, Equation 38 is equal to 1, Equation 39 is equal to $S_1$, and Equation 40 is equal to $S_2$.

$$= \sum_{i=0}^{n} \binom{i}{0} \binom{n}{i} p_i \quad \text{Equation 38}$$

$$= \sum_{i=1}^{n} \binom{i}{1} \binom{n}{i} p_i \quad \text{Equation 39}$$

$$= \sum_{i=1}^{n} \binom{i}{2} \binom{n}{i} p_i \quad \text{Equation 40}$$

A member of i sets indicates membership of $$\binom{i}{2}$$

pairwise intersections or those sets, and choosing i out of n possible can occur in $$\binom{n}{i}$$

ways. Remaining are the binomial-moment constraints, shown in Equations 41 below.

$$\sum_{i=0}^{n} \binom{i}{0}\binom{n}{i} p_i = 1 \quad \text{Equation 41}$$

$$\sum_{i=0}^{n} \binom{i}{1}\binom{n}{i} p_i = S_1$$

$$\sum_{i=0}^{n} \binom{i}{2}\binom{n}{i} p_i = S_2$$

Subject to some unknown $\{p_0, \ldots, p_n\}$ values. By the inclusion exclusion principle, an estimate of a total cardinality as some linear combination of $\{S_1, S_2\}$ can be generated. As both LB and UB are also linear combinations of $\{S_1, S_2\}$, an estimate of a union must be some weighted average between them for some $w \in [0,1]$, as shown in Equations 42 below.

$$Pr\left(\bigcup_{i=1}^{n} A_i\right) = S_1 - S_2 + S_3 - S_4 + \cdots \approx (1-w)(LB) + (w)(UB) \quad \text{Equation 42}$$

Excluding multiplicity of $$\binom{n}{i},$$

each or the $2^n$ mutually exclusive probabilities have a coefficient of 1. This is also true if $p_0$ is excluded as neither contribute to $S_1$ nor $S_2$. The average coefficient across the $2^n - 1$ remaining probabilities for each expression can be computed according to Equations 43 below.

$$1: \left[\sum_{i=1}^{n} \binom{i}{0}\binom{n}{i}\right] \Big/ \left[\sum_{i=1}^{n} \binom{n}{i}\right] = 1 \quad \text{Equations 43}$$

$$S_1: \left[\sum_{i=1}^{n} \binom{i}{1}\binom{n}{i}\right] \Big/ \left[\sum_{i=1}^{n} \binom{n}{i}\right] = \frac{2^{n-1} n}{2^n - 1}$$

$$S_2: \left[\sum_{i=1}^{n} \binom{i}{2}\binom{n}{i}\right] \Big/ \left[\sum_{i=1}^{n} \binom{n}{i}\right] = \frac{2^{n-3}(n-1)n}{2^n - 1}$$

$$LB: \left(\frac{2}{h+1}\right)\left(\frac{2^{n-1} n}{2^n - 1}\right) - \left(\frac{2}{h(h+1)}\right)\left(\frac{2^{n-3}(n-1)n}{2^n - 1}\right) = LB_{coef}$$

$$UB: (1)\left(\frac{2^{n-1} n}{2^n - 1}\right) - \left(\frac{2}{n}\right)\left(\frac{2^{n-3}(n-1)n}{2^n - 1}\right) = UB_{coef}$$

As the LB and UB form a linear combination, the average coefficient is also a linear combination. It can be shown that for $n \geq 2$ the LB average coefficient is always less than 1 and monotonically decreasing, and the UB average coefficient is always greater than 1 and monotonically increasing. Therefore, there exists a unique $w \in [0,1]$ such that the average coefficient of the weighted average would equal 1, as shown in Equations 44 below. When $n=2$, $UB_{coef}=1$, and therefore $w=1$, independent of h, the estimate $S_1 - S_2$, is yielded.

$$(1-w)(LB) + (w)(UB): 1 = (1-w)(LB_{coef}) + (w)(UB_{coef}) \quad \text{Equations 44}$$

$$w = \frac{1 - LB_{coef}}{UB_{coef} - LB_{coef}}$$

Using the same data as the above example the following values n=4, $S_1$=97,934, $S_2$=19,334, h=1, LB=78,600, UB=88,267, yield Equations 45 below. A point estimate is then provided by Equation 46 below. The answer, by construction, is 80,447. Although the example weights were derived from $S_1$ and $S_2$, the example weights could be applied to linear programming bounds that use $p_i$ and $p_{ij}$ for a different estimate. Such estimate may be of improved accuracy, as the bounds are tighter.

$$LB_{coef} = \frac{8}{15} = 0.53333 \quad \text{Equations 45}$$

$$UB_{coef} = \frac{4}{3} = 1.33333$$

$$w = \frac{7}{12} = 0.58333$$

$$\left|\bigcup_{i=1}^{n} A_i\right| \approx \left(1 - \frac{7}{12}\right)(78,600) + \left(\frac{7}{12}\right)(88,267) = 84,239 \quad \text{Equation 46}$$

$$\left|\bigcup_{i=1}^{n} A_i\right| \approx \left(1 - \frac{7}{12}\right)(79,029) + \left(\frac{7}{12}\right)(81,056) = 80,211 \quad \text{Equation 47}$$

When $2^n$ is relatively small, and all values in the sample covariance matrix are all positive, constructing linear programming bounds may be practical and the weights using $S_1$ and $S_2$ could be used as an approximate weight for the weighted average.

Consider any particular individual which has a private array from an assignment probability of r. If a bit-flipping noise probability is p then the probability that two independent noisy bits will agree is the sum of four distinct combinations, which can be defined as $p_1$ and is independent of assignment probability r, $p_1=(1-r)p^2+(1-r)(1-p)^2+rp^2+r(1-p)^2=1-2p(1-p)$.

If there are m bits in the array, the distribution of a matching number of bits would be a binomial distribution with parameters m and $p_1$. When m is large a normal approximation is used. Letting $X_1$ be the number of matching bits we have $X_1$–$D_1$, leading to Equation 48 below.

$$D_1 = N(\mu_1 = mp_1, \sigma_1^2 = mp_1(1-p_1)) \qquad \text{Equation 48}$$

If p=¼ with a bit array of length m=1024, $p_1$=⅝, and the number of matching bits between two independent noisy arrays from the same private array would be approximately normally distributed with mean 640 and variance 240.

Now consider the number of matching bits between two independent private arrays after each has been probabilistically bit-flipped with probability p. There are now eight combinations, enumerated in Table 1 below:

TABLE 1

| Private | Probability | Bit-Flip | Probability | Output |
|---|---|---|---|---|
| {0, 0} | $(1-r)^2$ | {N, N} | $(1-p)^2$ | {0, 0} |
| {0, 0} | $(1-r)^2$ | {Y, Y} | $(1-p)^2$ | {1, 1} |
| {0, 1} | $(1-r)r$ | {N, Y} | $(1-p)p$ | {0, 0} |
| {0, 1} | $(1-r)r$ | {Y, N} | $p(1-p)$ | {1, 1} |
| {1, 0} | $r(1-r)$ | {Y, N} | $p(1-p)$ | {0, 0} |
| {1, 0} | $r(1-r)$ | {N, Y} | $(1-p)p$ | {1, 1} |
| {1, 1} | $r^2$ | {Y, Y} | $p^2$ | {0, 0} |
| {1, 1} | $r^2$ | {N, N} | $(1-p)^2$ | {1, 1} |

If $p_2$ is designated as the probability two random noisy bits are the same, it is the sum of all eight combinations, $p_2=(1-r)^2(1-p)^2+\ldots+r^2(1-p)^2=1-2p(1-2r)^2+2p^2(1-2r)^2-2(1-r)r$. If p=½ or r=½ then $p_2$=½ independent of the other variable. If the length of the array is large enough, the normal distribution can be used as an approximation. Letting $X_2$ be the number of matching bits, $X_2$~$D_2$ with Equation 49 below.

$$D_2 = N(\mu_2 = mp_2, \sigma_2^2 = mp_2(1-P_2)) \qquad \text{Equation 49}$$

If the assignment probability is r=½, then $p_2$=½ independent of noise probability. If m=1024, a distribution of matching bits between two random noisy arrays would be approximately normally distributed with mean 512 and variance 256.

Determining a probability that there exists at least one of A noisy arrays that matches better than a specific private array compared to its own noisy arrays. This is the probability of a false-positive match, where the highest matching array is the same individual when in fact it is a random individual which matches better than an individual array with itself.

Equation 50 below shows $X_2$ for i-th array is ~$D_2$. In other words, if i={1, ..., A} for A independent random variables from $D_2$, Equation 51 below results. This can be defined analytically in terms of the density function of $D_1$ and the cumulative function of $D_2$. Defining $\varphi(x)$=PDF($D_1$,x) and $\Psi(x)$=CDF($D_2$,x) results in Equation 52 below. For example, if the assignment probability is r=0.4 and bit-flipping probability p=0.3, with array length m=512 and A=1,000 users, there would be a 40.9% chance a random user would have their noisy array match better to a known noisy array than to the user itself $$X_2^{(i)} \sim D_2 \qquad \text{Equation 50}$$

$$PR(X_1 < \max\{X_2^{(1)}, \ldots, X_2^{(A)}\}) \qquad \text{Equation 51}$$

-continued $$Pr(X_1 < \max\{X_2^{(1)}, \ldots, X_2^{(A)}\}) = 1 - \int_{-\infty}^{\infty} \phi(x)(\Psi(x))^A dx \qquad \text{Equation 52}$$

As beforementioned, examples disclosed herein are not limited to such manner of development as provided in association with Equations 1-52 and/or Table 1. Furthermore, use of examples disclosed herein is not dependent on any particular manner of development of such disclosed examples.

FIG. 2 is a block diagram of elements of an example implementation of the example system 100 for logging impressions of media accessed by client devices. FIG. 2 includes the example client device 108A, the example AME 102, the example database proprietor 130A, connected by an example network 220.

The example client device 108A includes an example browser 202, an example first app 204, an example second app 206, an example third app 208, and the example identity generation circuitry 104. The example identity generation circuitry 104 includes example first network interface circuitry 212, example array generation circuitry 214, example bit flip circuitry 216, and example distribution selection circuitry 218. Although only the example client device 108A is shown in FIG. 2, the example client devices 108B and 108C of FIG. 1 are structured and operate substantially similar to the client device 108A.

The example web browser 202 can access media (e.g., the media 112A-C of FIG. 1) via, for example, the Internet. In the example of FIG. 2, the example web browser 202 may, in response to downloaded monitoring instructions, generate, by the identity generation circuitry 104, at least one public identity array (e.g., one of the public identity arrays 122A-C of FIG. 1). In the example of FIG. 2, the at least one public identity array is sent to the database proprietor 130A. In some examples, the public identity array is additionally, and/or alternatively, sent to the AME 102.

The example first app 204, the example second app 206, and the example third app 208 provide functionality (e.g., weather, stocks, calculator, mobile game, etc.) to the client device 108A. The example apps 204-208 may access separate types of media (e.g., respective ones of the media 112A-C of FIG. 1) via, for example, the Internet. In response to such access, ones of the plurality of apps 204-208 may, by the identity generation circuitry 104, generate at least one corresponding public identity array (e.g., one of the public identity arrays 122A-C of FIG. 1). In the example of FIG. 2, each of the example browser 202, the example first app 204, the example second app 206, and the example third app 208 cause the identity generation circuitry 104 to generate public arrays for transmission to a database proprietor (e.g., one of the database proprietors 130A-C of FIG. 1). In some examples, ones of the example browser 202, the example first app 204, the example second app 206, and the example third app 208 may send an indication to the example identity generation circuitry 104. In response to the indication, the identity generation circuitry 104 may generate a plurality of public arrays, ones of the plurality of public arrays associated with ones of the example browser 202, the example first app 204, the example second app 206, and the example third app 208.

The example array generation circuitry 214 can generate a private array (e.g., a private identifier) to identify the example client device 108A. In some examples, the array generation circuitry 214 may generate the private array based on a universally unique identifier (UUID), a media access control (MAC) address, a timestamp, a cryptographic hashing, etc. For example, the array generation circuitry 214 may generate a private array of length m, where all $2^m$ combinations are equally likely. In some examples, the length of the private array may be selected to reduce a probability of a collision. In some examples, the length of the private identifier is based on an audience size of a first media platform.

Increasing the length of the private array generally reduces the probability that the same private array is generated twice (e.g., the same array associated with two unique users). In some examples, the array generation circuitry 214 may instead retrieve a private array from a location stored in memory and use the private array to identify an audience member.

The example bit flip circuitry 216 may perform a first bit-flipping operation based on the private identifier to generate a first public identifier to identify the audience member to a first media platform (e.g., one of the media platforms 106A-C) and/or an application and/or a browser of the example client device 108A. For example, the first bit-flipping operation may bit-flip (e.g., change a bit from a 1 to a 0) first ones of bits of the private identifier to generate a public identity array to be sent, by the network interface circuitry 212, to the audience measurement entity 102 and/or the database proprietor 130A. The example bit flip circuitry 216 may then perform a second bit-flipping operation based on the private identifier to generate a second public identity array to identify the audience member to a second media platform, the second bit-flipping operation to bit-flip second ones of the bits of the private identifier. In some examples, the bit-flip circuitry 216 may flip any number of bits of the private array. Bits of the private array may be selected for flipping and/or flipped based on Equations 1-4 above.

The example distribution selection circuitry 218 can receive a bit-flipping distribution from the database proprietor 130A and/or the AME 102. In some examples, the bit-flipping distribution may be generated by the distribution selection circuitry 218. In such an example, the distribution selection circuitry 218 may transmit the generated bit-flipping distribution to the database proprietor 130A and or the AME 102. By transmitting a public array without transmitting the corresponding private array, the example client device 108A can easily change the public array, which can improve privacy of the client device 108A. In some examples, the bit-flip circuitry 216 may use the bit-flipping distribution (e.g., bit-flipping probability distribution) to determine ones of a plurality of bits of a private identity array to flip. For example, a private identity array may be defined as [0, 1, 1, 0], and an example bit-flipping distribution may be a uniform probability distribution in which each bit is flipped with a probability of ¼. In response to a request to generate a public identity array (e.g., generate the example public identity array 122A of FIG. 1) the bit-flip circuitry 216 may determine if a first bit of the private identity array is to be flipped (e.g., change the 0 to a 1). In this example, the first bit would be flipped 25% of the time. The bit-flip circuitry 216 makes a similar determination for the second bit, the third bit, and the forth bit. An example output (e.g., a public identity array) may be [1, 1, 1, 0]. Thus, in this example, only the first bit was flipped, although each bit had a ¼ probability of being flipped.

The example identity generation circuitry 104 includes the network interface circuitry 212. The example network interface circuitry 212 communicates with the browser 202 and/or the apps 204-208 in order to receive and or transmit identity arrays to/from the database proprietor 130A.

The example AME 102 includes the example identity analysis circuitry 118, example audience metrics generation circuitry 234, example AME database management circuitry 260, and the example AME database 126. The example identity analysis circuitry 118 includes example cardinality estimation circuitry 222, example public array aggregation circuitry 224, example mean center circuitry 226, example bit-level operation circuitry 228, example point estimation circuitry 230, and example bound determination circuitry 232. The example audience metrics generation circuitry 234 includes example second network interface circuitry 236, and example audience size estimation circuitry 238.

The example identity analysis circuitry 118 analyzes aggregated arrays provided by the database proprietor 130A to generate a point estimate of a deduplicated audience across a plurality of database proprietors (e.g., the database proprietors 130A-C of FIG. 1). The example network interface circuitry 236 of the audience metrics generation circuitry 234 retrieves the aggregated arrays and/or associated information (e.g., individual cardinality for a platform, a pairwise cardinality of an intersection of two platforms, etc.). The example network interface circuitry 236 can provide the cardinality estimation circuitry 222 data. In response to specific data, the cardinality estimation circuitry 222 performs different operations.

For example, the cardinality estimation circuitry 222 can calculate an individual cardinality for a specific platform such as the database proprietor 130A. If the individual cardinality is given, then there is nothing to estimate, and Equation 16 above holds. If the individual cardinalities for a media platform (e.g., one of the media platforms 106A-C of FIG. 1 is not provided, but a raw count array from the database proprietor 130A is provided, then Equation 17 above can be used to estimate the individual cardinality for the media platform. If a mean centered array is provided, then Equation 18 above is used to calculate the individual cardinality.

The example cardinality estimation circuitry 222 can additionally calculate the pairwise cardinality of an intersection (e.g., members that appear in multiple ones of the media platforms 106A-C) between two or more of the database proprietors 130A-C. The cardinality estimation circuitry 222 may use Equations 19-20 above to estimate the cardinality of the intersection.

The example cardinality estimation circuitry 222 can estimate a sum of individual cardinalities. If database proprietors 130A-C provide, via the second network interface circuitry 236, the individual cardinalities, then the public array aggregation circuitry 224 and/or the bit-level operation circuitry 228 can sum the cardinalities directly to estimate the sum. Alternatively, the cardinality estimation circuitry can estimate individual cardinalities (e.g., via Equations 19-20 above) and sum the estimated individual cardinalates to estimate the sum. If the audience measurement entity 102 is given raw arrays from the database proprietor 130A, Equations 23-25 above can be used to estimate the individual cardinalities.

The example cardinality estimation circuitry 222 can additionally generate an estimate of the sum of pairwise cardinalities. For example, if the pairwise cardinalities of intersection (e.g., members of more than one platform) is provided, the cardinality estimation circuitry 222 can directly sum the pairwise cardinalities to estimate the sum of pairwise cardinalities. If the example audience measurement entity 102 is given raw arrays from the database proprietor 130A, Equations 23-25 above can be used to estimate the sum of pairwise cardinalities. If the example audience measurement entity 102 is given zero-meaned arrays and the sum of individual cardinalities is known, Equation 27 above can be used to estimate the sum of pairwise cardinalities. If the sum of individual cardinalities is not known, the example cardinality estimation circuitry 222 uses Equations 28 above to generate an estimate of the sum of pairwise cardinalities.

The example bound determination circuitry 232 generates an estimated lower and upper bound of a deduplicated audience size across database proprietors 130A-C. If the sum of individual and pairwise cardinalities is known, a lower bounds can be calculated according to Equations 30 above, and an upper bounds can be determined by Equation 32 above. Alternatively, if the individual and pairwise cardinalities for each media platform 106A-C are provided, the lower bounds can be calculated based on a first equation of Equations 31 above and an upper bounds can be calculated based on Equation 33 above.

The example point estimation circuitry 230 can generate a point estimate for the deduplicated audience size as a function of estimated lower and upper bounds. To generate a point estimate, the example point estimation circuitry 230 uses Equations 42 to compute a lower bound coefficient and an upper bound coefficient. The example point estimation circuitry 230 next uses Equations 43 to compute a weight for the point estimate. The example point estimation circuitry 230 may compute a point estimate based on Equations 41. In some examples, the point estimation circuitry 230 may use a mid-point between the estimated lower and upper bounds to generate a point estimate.

The example AME 102 additionally includes the audience size estimation circuitry 238. The example audience size estimation circuitry 238 receives data (e.g., a point estimate, a bounds estimate, etc.) from the cardinality estimation circuitry 222. In turn, the audience size estimation circuitry 238 can calculate an audience size to send to, for example, a database proprietor 130A-C.

The example AME database management circuitry 260 manages data stored in the example AME database 126. For example, the AME database management circuitry 260 may store data such as distribution information, estimated cardinalities, public identity arrays, private identity arrays, demographic information, database proprietor data, etc.

The example database proprietor 130A includes example public identity control circuitry 242, example database management circuitry 252, and the example database 124A. The example public identity control circuitry 242 includes public array aggregation circuitry 244, example bitwise operation circuitry 246, example third network interface circuitry 248, and example distribution generation circuitry 250. Although only the database proprietor 130A is shown in FIG. 2, the database proprietors 130B and 130C of FIG. 1 are structured and operate similar to the database proprietor 130A.

The example public identity control circuitry 242 performs operations to manage a plurality of public identity arrays from client devices (e.g., the example client devices 122A-C from the client devices 108 of FIG. 1). The example public array aggregation circuitry 244 may take a plurality of public identity arrays from a plurality of devices 108 and aggregate (e.g., sum all similarly indexed array elements) the public identity arrays using an adder and/or specialized circuitry. For example, a first public identity array may include values [1, 0, 1, 1], a second public identity array may include values [0, 1, 1, 0], and a third public identity array may include values [1, 1, 1, 0]. In such an example, the public array aggregation circuitry 244 may aggregate the first, second, and third public identity arrays to generate a first aggregated public identity array including values [2, 2, 3, 1]. In some examples, the aggregated public identity array may be mean centered. For example, the first aggregated public identity array may be mean centered to include values [−1, −1, 1, −2].

In some examples, the distribution generation circuitry 250 generates a distribution for use by the example client device 108A. In some examples, a plurality of database proprietors 130A-C agree on an expected value, and each media platform 106A-C (FIG. 1) generates a specific bit-flipping distribution. For example, the distribution generation circuitry 250 and/or the distribution selection circuitry 218 may generate distributions bounded on a possible subset of [0, 1] as shown in Equations 10 above. The specific bit-flipping distribution may then be sent to client devices (e.g., the client device 108A). In some examples, all client devices 108 may share an expected value, but the bit-flipping probability distribution varies from device to device (e.g., the identity generation circuitry 104 of respective client devices 108 selects the bit-flipping probability). In examples when all the expected values equal ¼, Equation 11 above is used, involving bit-level multiplication and addition performed by the bitwise operation circuitry 246. The example third network interface circuitry 248 facilitates communication between the database proprietor 130A and the client device 108A and between the database proprietor 130A and the example AME 102.

The example database proprietor 130A additionally includes database management circuitry 252 and the example database 124A. The example database 124A may store public identity arrays (e.g., the public identity array 122A of FIG. 1), private identity array information, and/or any personally identifiable information (PII) (e.g., full name, street address, residence city and state, telephone numbers, email addresses, ages, dates of birth, gender, etc.). The example third database management circuitry 252 may, for example, send or receive information to the public identity control circuitry 242, the client device 108A, and/or the audience measurement entity 102.

Figure 3:
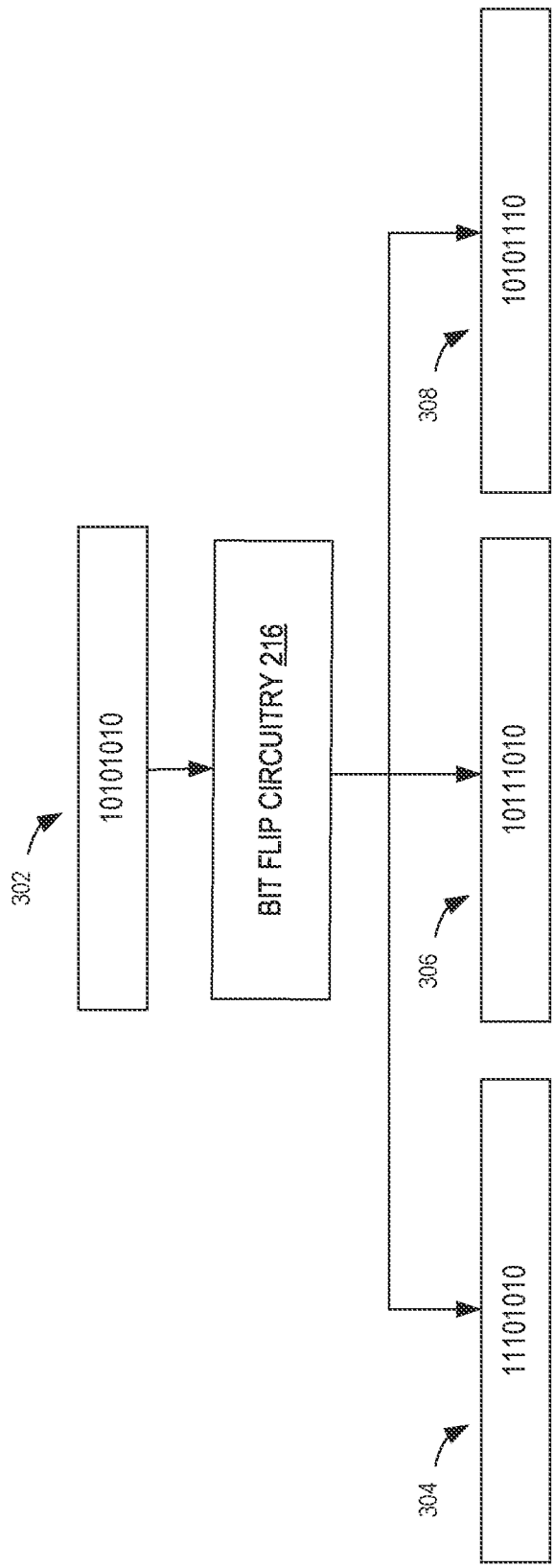
FIG. 3 is an example illustration of generating public identity arrays.

FIG. 3 is an example illustration of generating public identity arrays. Examples disclosed herein may be used to generate an identifier which is sandboxed within a website or app (such that it does not allow for longitudinal tracking) but has statistical properties seeded from a commonly sourced ID (in order to allow for estimating unique audience). Examples disclosed herein provide a method for creating app/site specific IDs from a commonly seeded ID (such as hashed email) by randomly flipping bits of that seed ID. Examples disclosed herein may also be used to combine those app/site specific IDs in a way that allows for the estimation of unique audiences.

FIG. 3 includes an example private identity array 302, the example bit-flip circuitry 216, an example first public identity array 304, an example second public identity array 306, and an example third public identity array 308. The example private identity array 302 identifies a client device (e.g., one of the client devices 108 of FIG. 1). The example bit-flip circuitry 216 performs three bit flipping operations to generate the public identity arrays 304-308. The example public identity array 304 is generated by flipping an example second-most significant bit of the private identity array 302. The example public identity array 306 is generated by flipping an example fourth-most significant bit of the private identity array 302. The example public identity array 308 is generated by flipping an example sixth-most significant bit of the private identity array 302.

In some examples, apparatus disclosed herein include(s) means for determining sums of estimated cardinalities of audience members (e.g., a first sum of estimated individual cardinalities of audience members of first and second media platforms and a second sum of estimated pairwise cardinalities of ones of the audience members belonging to both the first and second media platforms). For example, the means for determining sums of estimated cardinalities of audience members may be implemented by the example cardinality estimation circuitry 222 of FIG. 2. In some examples, the cardinality estimation circuitry 222 of FIG. 2 may be implemented by machine executable instructions such as that implemented by at least blocks 406, 408, 410, 412, 500, 500 504, 506, 508 of FIGS. 4 and 5 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the cardinality estimation circuitry 222 is implemented by other hardware logic circuitry, hardware implemented state machines, and/or any other combination of hardware, software, and/or firmware. For example, the cardinality estimation circuitry 222 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, apparatus disclosed herein include(s) means for generating lower and upper bound estimates of a deduplicated audience size based on the first and second sums. For example, the means for generating lower and upper bound estimates may be implemented by the example bound determination circuitry 232 of FIG. 2. In some examples, the bound determination circuitry 232 may be implemented by machine executable instructions such as that implemented by at least blocks 416, 420, 600, 602, 604, 700, 702, 704 of FIGS. 4, 6, and 7 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the bound determination circuitry 232 is implemented by other hardware logic circuitry, hardware implemented state machines, and/or any other combination of hardware, software, and/or firmware. For example, the bound determination circuitry 232 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, apparatus disclosed herein include(s) means for sending a deduplicated audience size to a computing device via a network communication. For example, the means for sending a deduplicated audience size may be implemented by the example network interface circuitry 236 of FIG. 2. In some examples, the network interface circuitry 236 may be implemented by machine executable instructions such as that implemented by at least block 422 of FIG. 4 and executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the network interface circuitry 236 is implemented by other hardware logic circuitry, hardware implemented state machines, and/or any other combination of hardware, software, and/or firmware. For example, the network interface circuitry 236 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, apparatus disclosed herein include(s) means for generating a point estimate of the deduplicated audience size based on a weighted average of extremes of the lower and upper bound estimates. For example, the means for generating a point estimate may be implemented by the point estimation circuitry 230 of FIG. 2. In some examples, the point estimation circuitry 230 may be implemented by machine executable instructions such as that implemented by at least blocks 418, 420, 702, and 704 of FIGS. 4 and 7 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the point estimation circuitry 230 of FIG. 2 is implemented by other hardware logic circuitry, hardware implemented state machines, and/or any other combination of hardware, software, and/or firmware. For example, the point estimation circuitry 230 of FIG. 2 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate In some examples, apparatus disclosed herein include(s) means for accessing a private identifier, the private identifier to identify an audience member. For example, the means for accessing a private identifier may be implemented by the array generation circuitry 214. In some examples, array generation circuitry 214 may be implemented by machine executable instructions such as that implemented by at least block 902 of FIG. 9 and executed by processor circuitry, which may be implemented by the example processor circuitry 1012 of FIG. 10, the example processor circuitry 1300 of FIG. 13, and/or the example Field Programmable Gate Array (FPGA) circuitry 1400 of FIG. 14. In other examples, the example bit-flip circuitry 216 is implemented by other hardware logic circuitry, hardware implemented state machines, and/or any other combination of hardware, software, and/or firmware. For example, the example bit-flip circuitry 216 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, apparatus disclosed herein include(s) means for performing bit-flipping operations (e.g., a first bit-flipping operation based on a private identifier to generate a first public identity array to identify an audience member to a first media platform, a second bit-flipping operation based on the private identifier to generate a second public identity array to identify the audience member to a second media platform). For example, the means for performing a bit-flipping operations maybe implemented by the bit-flip circuitry 216 of FIG. 2. In some examples, the example bit-flip circuitry 216 may be implemented by machine executable instructions such as that implemented by at least block 904, 906 FIG. 9 and executed by processor circuitry, which may be implemented by the example processor circuitry 1012 of FIG. 10, the example processor circuitry 1300 of FIG. 13, and/or the example Field Programmable Gate Array (FPGA) circuitry 1400 of FIG. 14. In other examples, the example bit-flip circuitry 216 is implemented by other hardware logic circuitry, hardware implemented state machines, and/or any other combination of hardware, software, and/or firmware. For example, the example bit-flip circuitry 216 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, apparatus disclosed herein include(s) means for generating a bit-flipping probability distribution. For example, the means for generating a bit-flipping probability distribution may be implemented by the distribution generation circuitry 218 of FIG. 2. In some examples, the distribution generation circuitry 218 may be implemented by machine executable instructions such as that implemented by at least block 802, 804 of FIG. 8 and executed by processor circuitry, which may be implemented by the example processor circuitry 1012 of FIG. 10, the example processor circuitry 1300 of FIG. 13, and/or the example Field Programmable Gate Array (FPGA) circuitry 1400 of FIG. 14. In other examples, the distribution generation circuitry 218 is implemented by other hardware logic circuitry, hardware implemented state machines, and/or any other combination of hardware, software, and/or firmware. For example, the distribution generation circuitry 218 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate. In some examples the means for generating a bit-flipping probability distribution is further to vary the bit-flipping probability distribution on a bit-by-bit basis.

In some examples, apparatus disclosed herein include(s) means for receiving a bit-flipping probability distribution (e.g., from a media platform). For example, the means for receiving a bit-flipping probability distribution may be implemented by the network interface circuitry 212 of FIG. 2. In some examples, the network interface circuitry 212 of FIG. 2 may be implemented by machine executable instructions such as that implemented by at least block 806, 812 of FIG. 8 and executed by processor circuitry, which may be implemented by the example processor circuitry 1012 of FIG. 10, the example processor circuitry 1300 of FIG. 13, and/or the example Field Programmable Gate Array (FPGA) circuitry 1400 of FIG. 14. In other examples, the network interface circuitry 212 of FIG. 2 is implemented by other hardware logic circuitry, hardware implemented state machines, and/or any other combination of hardware, software, and/or firmware. For example, the network interface circuitry 212 of FIG. 2 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While example manners of implementing the example client device 108A of FIG. 1, the example AME 102 of FIG. 1, and/or the example database proprietor 130A of FIG. 1 are illustrated in FIG. 2, one or more of the elements, processes, and/or devices illustrated in FIG. 2 may be combined, divided, re-arranged, omitted, eliminated, and/or implemented in any other way. Further, the example browser 202, the example first app 204, the example second app 206, the example third app 208, the example identity generation circuitry 104, the example first network interface circuitry 212, the example array generation circuitry 214, the example bit flip circuitry 216, the example distribution selection circuitry 218, the example identity analysis circuitry 118, the example audience metrics generation circuitry 234, the example AME database management circuitry 260, the example AME database 126, the example identity analysis circuitry 118, the example cardinality estimation circuitry 222, the example public array aggregation circuitry 224, the example mean center circuitry 226, the example bit-level operation circuitry 228, the example point estimation circuitry 230, the example bound determination circuitry 232, the example audience metrics generation circuitry 234, the example second network interface circuitry 236, example audience size estimation circuitry 238, the example public identity control circuitry 242, the example public array aggregation circuitry 244, the example bitwise operator circuitry 246, the example third network interface circuitry 248, the example distribution generation circuitry 250, the example database management circuitry 252, the example AME database management circuitry 260 and/or the example database 124A may be implemented by hardware, software, firmware, and/or any combination of hardware, software, and/or firmware. Thus, for example, any of the example browser 202, the example first app 204, the example second app 206, the example third app 208, the example identity generation circuitry 104, the example first network interface circuitry 212, the example array generation circuitry 214, the example bit flip circuitry 216, the example distribution selection circuitry 218, the example identity analysis circuitry 118, the example audience metrics generation circuitry 234, the example AME database management circuitry 260, the example AME database 126, the example identity analysis circuitry 118, the example cardinality estimation circuitry 222, the example public array aggregation circuitry 224, the example mean center circuitry 226, the example bit-level operation circuitry 228, the example point estimation circuitry 230, the example bound determination circuitry 232, the example audience metrics generation circuitry 234, the example second network interface circuitry 236, example audience size estimation circuitry 238, the example public identity control circuitry 242, the example public array aggregation circuitry 244, the example bitwise operator circuitry 246, the example third network interface circuitry 248, the example distribution generation circuitry 250, the example database management circuitry 252, the example AME database management circuitry 260 and/or the example database 124A and/or, more generally, the example client device 108A, the example AME 102, and/or the example database proprietor 130A of FIGS. 1 and 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example browser 202, the example first app 204, the example second app 206, the example third app 208, the example identity generation circuitry 104, the example first network interface circuitry 212, the example array generation circuitry 214, the example bit flip circuitry 216, the example distribution selection circuitry 218, the example identity analysis circuitry 118, the example audience metrics generation circuitry 234, the example AME database management circuitry 260, the example AME database 126, the example identity analysis circuitry 118, the example cardinality estimation circuitry 222, the example public array aggregation circuitry 224, the example mean center circuitry 226, the example bit-level operation circuitry 228, the example point estimation circuitry 230, the example bound determination circuitry 232, the example audience metrics generation circuitry 234, the example second network interface circuitry 236, example audience size estimation circuitry 238, the example public identity control circuitry 242, the example public array aggregation circuitry 244, the example bitwise operator circuitry 246, the example third network interface circuitry 248, the example distribution generation circuitry 250, the example database management circuitry 252, the example AME database management circuitry 260 and/or the example database 124A is/are hereby expressly defined to include a non-transitory computer readable storage device or storage disk such as a memory, a digital versatile disk (DVD), a compact disk (CD), a Blu-ray disk, etc., including the software and/or firmware. Further still, the example client device 108A, the example AME 102, and/or the example database proprietor 130A of FIGS. 1 and 2 may include one or more elements, processes, and/or devices in addition to, or instead of, those illustrated in FIG. 2, and/or may include more than one of any or all of the illustrated elements, processes and devices.

Flowcharts representative of example hardware logic circuitry, machine readable instructions, hardware implemented state machines, and/or any combination thereof for implementing the example client device 108A, the example AME 102, and/or the example database proprietor 130A of FIGS. 1 and 2 are shown in FIGS. 4-9. The machine readable instructions may be one or more executable programs or portion(s) of an executable program for execution by processor circuitry, such as the processor circuitry 1012, 1112, 1212 shown in the example processor platforms 1000, 1100, 1200 discussed below in connection with FIGS. 10-12 and/or the example processor circuitry discussed below in connection with FIGS. 13 and/or 14. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 4-9, many other methods of implementing the example client device 108A, the example AME 102, and/or the example database proprietor 130A of FIGS. 1 and 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
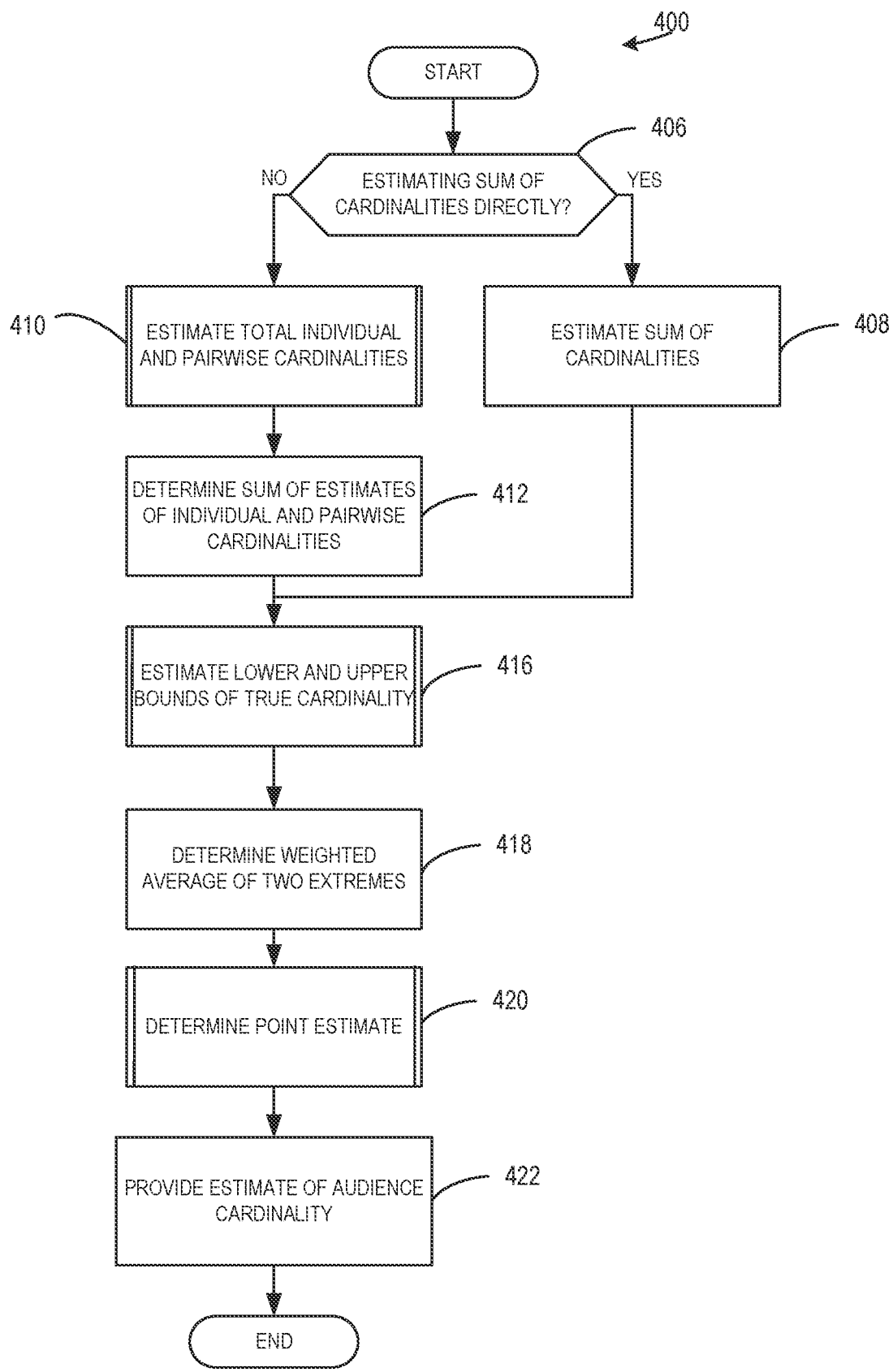
FIG. 4 is a flowchart representative of example machine readable instructions and/or operations that may be executed and/or instantiated by processor circuitry to implement identity analysis circuitry to provide an estimate of a deduplicated audience cardinality.

FIG. 4 is a flowchart representative of example machine readable instructions and/or example operations 400 that may be executed and/or instantiated by processor circuitry to implement an apparatus to provide an estimate of a deduplicated audience cardinality at the audience measurement entity 102 of FIGS. 1 and 2. The machine readable instructions and/or operations 400 of FIG. 4 begin at block 406, at which the example cardinality estimation circuitry 222 of FIG. 2 determines whether sums of cardinalities are to be estimated directly. For example, the cardinality estimation circuitry 222 makes the determination of block 406 based on whether individual and pairwise cardinalities for each platform are provided by a database proprietor (e.g., one of the database proprietors 130A-C of FIG. 1).

If individual and pairwise cardinalities are not given (e.g., only aggregated identity arrays from database proprietors 130A-C are available), the example cardinality estimation circuitry 222 of FIG. 2 estimates total individual and pairwise cardinalities at block 410. For example, the cardinality estimation circuitry 222 of FIG. 2 can estimate the total individual cardinality based on Equation 17 above. The cardinality estimation circuitry 222 of FIG. 2 may, for example, estimate the total pairwise cardinality based on Equations 19-20 above. Example instructions that may be used to implement block 410 are described below in connection with the flowchart of FIG. 5.

At block 412, the example cardinality estimation circuitry 222 of FIG. 2 and/or the example public array aggregation circuitry 224 of FIG. 2 and/or the example point estimation circuitry 230 of FIG. 2 determines a sum of estimates of individual and pairwise cardinalities. For example, the sum of estimates of individual and pairwise cardinalities can be determined by summing the individual and pairwise cardinalities according to Equations 21 above.

At block 406, if the example cardinality estimation circuitry 222 of FIG. 2 determines the sums of cardinalities are to be estimated directly, the instructions continue at block 408 where the example cardinality estimation circuitry 222 of FIG. 2 estimates sums of cardinalities directly. For example, a sum of cardinalities can be estimated directly using Equations 22-25 above.

At block 416, the example bound determination circuitry 232 of FIG. 2 estimates lower and upper bounds of a true cardinality (e.g., a deduplicated audience cardinality). Example instructions that may be used to implement block 416 are described below in connection with the flowchart of FIG. 6. For example, the bound determination circuitry 232 can determine a lower bound according to Equations 30 above, and an upper bound can be determined by Equation 32 above. Additionally or alternatively, the lower bounds can be calculated based on Equations 31 above and an upper bounds can be calculated based on Equation 33 above.

At block 418, the point determination circuitry 230 determines a weighted average of two extremes. For example, the point determination circuitry 230 can take a weighted average of the lower and upper bounds according to Equation 37 above.

At block 420, the point determination circuitry 230 of FIG. 2 determines a point estimate. Example instructions that may be used to implement block 420 are described below in connection with the flowchart of FIG. 7. At block 422 the example audience size estimation circuitry 238 of FIG. 2 provides an estimate of a deduplicated audience cardinality based on the point estimate determined at block 420. For example, the audience size estimation circuitry 238 of FIG. 2 can provide an estimate of a deduplicated audience by rounding the point estimate of block 420. In some examples, the deduplicated audience size is stored in a report in memory and transmitted to a computing device or server of an example database proprietor (e.g., the example database proprietors 130A-C of FIG. 1). The example instructions of FIG. 4 end.

Figure 5:
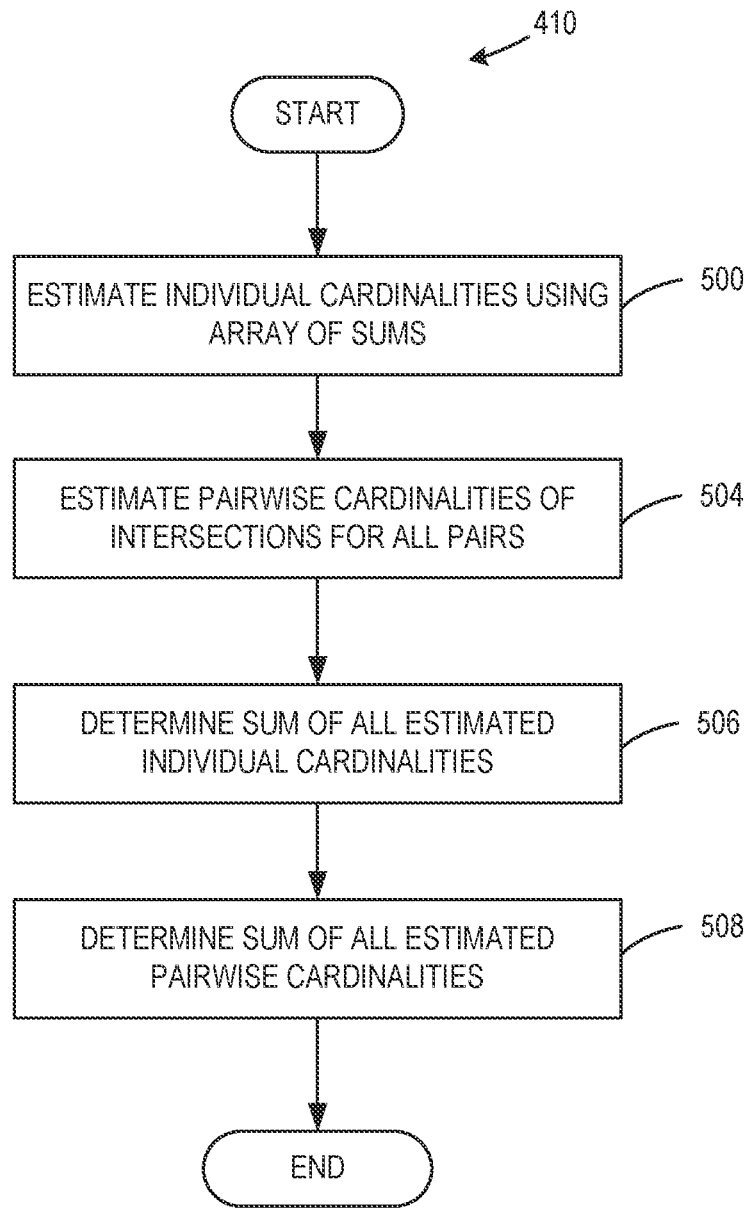
FIG. 5 is a flowchart representative of example machine readable instructions and/or operations that may be executed and/or instantiated by processor circuitry to implement example cardinality estimation circuitry to estimate individual cardinalities using an array of sums.

FIG. 5 is a flowchart representative of example machine readable instructions and/or example operations 410 that may be executed and/or instantiated by processor circuitry to estimate individual cardinalities using an array of sums. The example machine readable instructions and/or operations 410 of FIG. 5 may be used to implement block 410 of FIG. 4.

The example machine readable instructions and/or operations 410 of FIG. 5 begin at block 500, at which the example cardinality estimation circuitry 222 of FIG. 2 estimates individual cardinalities using an array of sums. For example, the individual cardinalities may be estimated using Equation 17 above. Additionally or alternatively, if a mean-centered array of sums is provided, Equation 18 above can be used to estimate the individual cardinalities.

At block 504, the example cardinality estimation circuitry 222 of FIG. 2 estimates pairwise cardinalities of intersections for all pairs. For example, pairwise cardinalities of intersections can be estimated based on Equations 19-20 above. At block 506, the example cardinality estimation circuitry 222 determines a sum of all estimated individual cardinalities. For example, a sum of all estimated individual cardinalities can be determined by adding individual cardinalities estimated at block 500. At block 508 the example cardinality estimation circuitry 222 of FIG. 2 determines a sum of all estimated pairwise cardinalities. For example, a sum of all estimated pairwise cardinalities can be determined by adding pairwise cardinalities estimated at block 504. In some examples, the sum of estimated pairwise cardinalities includes audience members belonging to both the first and second media platforms (e.g., two of the media platforms 106A-C of FIG. 1). The example instructions 410 end.

Figure 6:
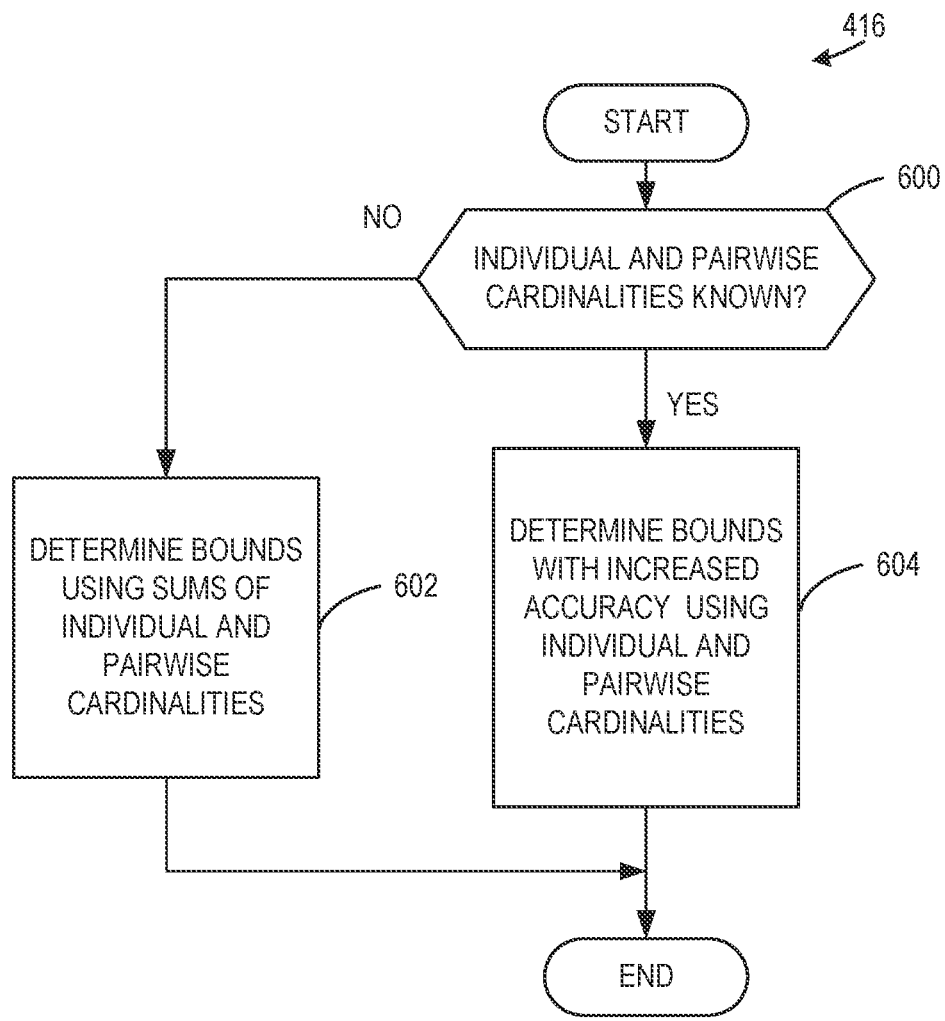
FIG. 6 is a flowchart representative of example machine readable instructions and/or example operations that may be executed and/or instantiated by processor circuitry to implement example bound determination circuitry to estimate lower and upper bounds of the true cardinality.

FIG. 6 is a flowchart representative of example machine readable instructions and/or example operations 416 that may be executed and/or instantiated by processor circuitry to estimate lower and upper bounds of the true cardinality. The example machine readable instructions and/or example operations 416 may be used to implement block 416 of FIG. 4.

The example machine readable instructions and/or operations 416 of FIG. 6 begin at block 600, at which the example bound determination circuitry 232 of FIG. 2 determines if individual and pairwise cardinalities are known. For example, the bound determination circuitry 232 can make the determination based on whether cardinality data is provided to the bound determination circuitry. If so, at block 604, the bound determination circuitry 232 determines lower and upper bounds with increased accuracy using the individual and pairwise cardinalities. For example, when individual and pairwise cardinalities are known, the bound determination circuitry 232 can determine a lower bound based on Equations 30, and an upper bound based on Equation 32.

If individual and pairwise cardinalities are not known, at block 602 the example bound determination circuitry 232 of FIG. 2 determines lower and upper bounds using sums of individual and pairwise cardinalities. In such an example, a lower bound can be determined based on Equations 31 and an upper bound can be determined based on Equation 33. The example instructions 416 end.

Figure 7:
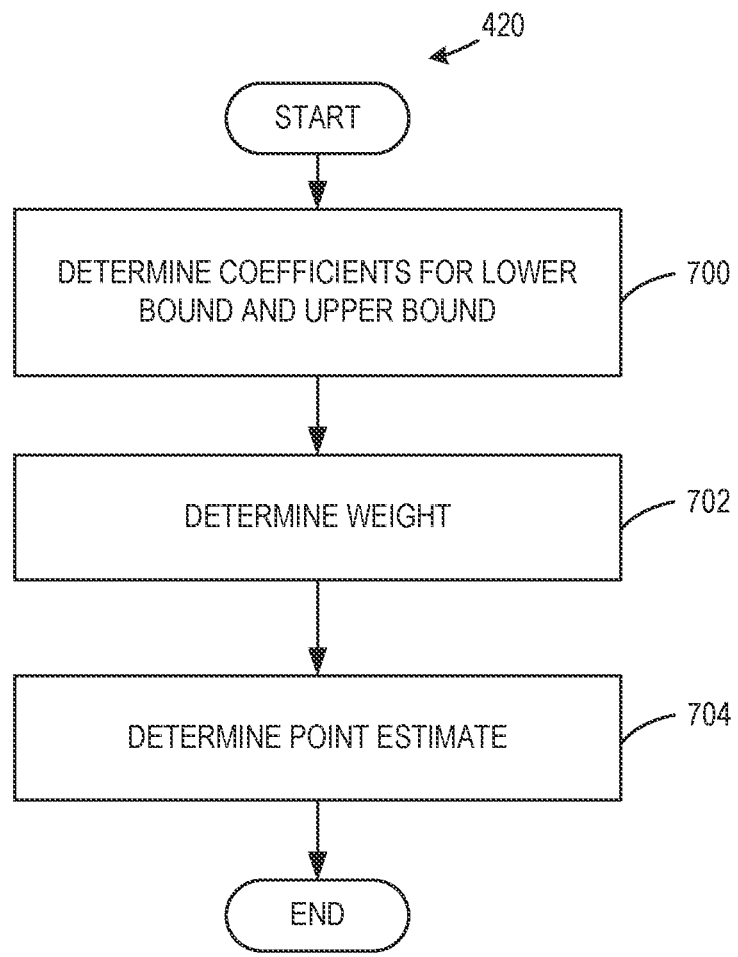
FIG. 7 is a flowchart representative of example machine readable instructions and/or example operations that may be executed and/or instantiated by processor circuitry to implement example point estimate circuitry to determine a point estimate.

FIG. 7 is a flowchart representative of example machine readable instructions and/or example operations 420 that may be executed and/or instantiated by processor circuitry determine a point estimate. The example machine readable instructions and/or operations 420 may be used to implement block 420 of FIG. 4.

The example machine readable instructions and/or operations 420 of FIG. 7 begin at block 700, at which the example point estimation circuitry 230 of FIG. 2 determines coefficients for lower and upper bounds. For example, the coefficients can be determined based on Equations 43. At block 702, the example point estimation circuitry 230 of FIG. 2 determines a weight value. For example, the weight value can be calculated based on Equations 44. At block 704, the example point estimation circuitry 230 of FIG. 2 determines a point estimate. For example, the point estimation circuitry 230 may compute a point estimate based on Equations 41. In some examples, the point estimation circuitry 230 may use a mid-point between the estimated lower and upper bounds to generate a point estimate. Additionally or alternatively, a weighted average of extremes of upper and lower bounds can be used to generate a point estimate. The example instructions 420 end.

Figure 8:
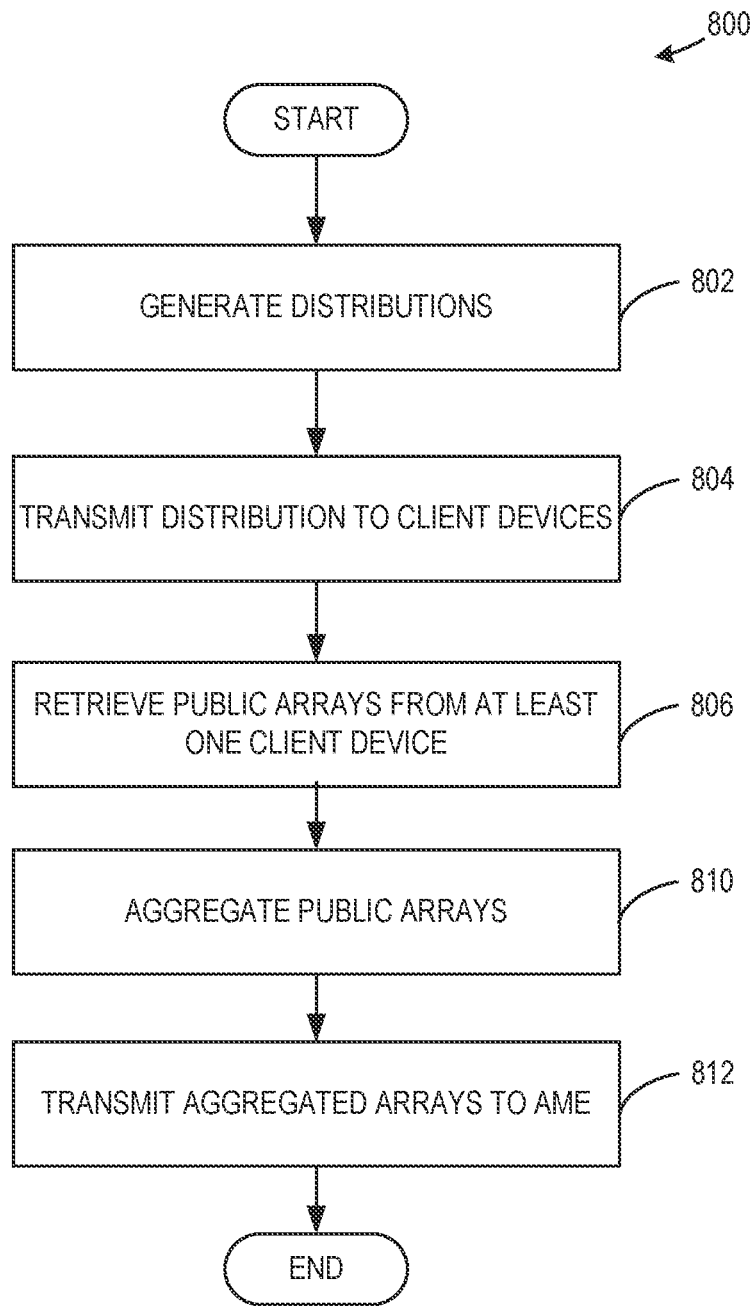
FIG. 8 is a flowchart representative of example machine readable instructions and/or example operations that may be executed and/or instantiated by processor circuitry to implement example distribution generation circuitry to process public array information.

FIG. 8 is a flowchart representative of example machine readable instructions and/or example operations 800 that may be executed and/or instantiated by processor circuitry to implement an apparatus to process public array information at a database proprietor (e.g., the database proprietor 130A of FIGS. 1 and 2). The example machine readable instructions and/or operations 800 of FIG. 8 begin at block 802, at which the example distribution generation circuitry 250 of FIG. 2 generates a probability distribution for use by a client device (e.g., the client device 108A of FIGS. 1 and 2). For example, a probability distribution (e.g., a bit-flipping distribution) can be generated based on an expected value of the client device (e.g., the client device 108A of FIGS. 1 and 2). At block 804, the example third network interface circuitry 248 of FIG. 2 transmits the generated distribution to the client device. For example, the distribution can be transmitted via the example network 220 of FIG. 2. At block 806, the example third network interface circuitry 248 of FIG. 2 accesses a public array from at least one client device. For example, the public array can be accessed based on a connection, via the network 220, of the first network interface circuitry 212 and the third network interface circuitry 248. At block 810, the example public array aggregation circuitry 244 of FIG. 2 and/or the example bitwise operator circuitry 246 of FIG. 2 aggregates the public arrays. For example, the public arrays may be aggregated based on a summation of similarly indexed array elements using an adder. At block 812, the example network interface circuitry 248 of FIG. 2 transmits the aggregated arrays to the AME 102.

Figure 9:
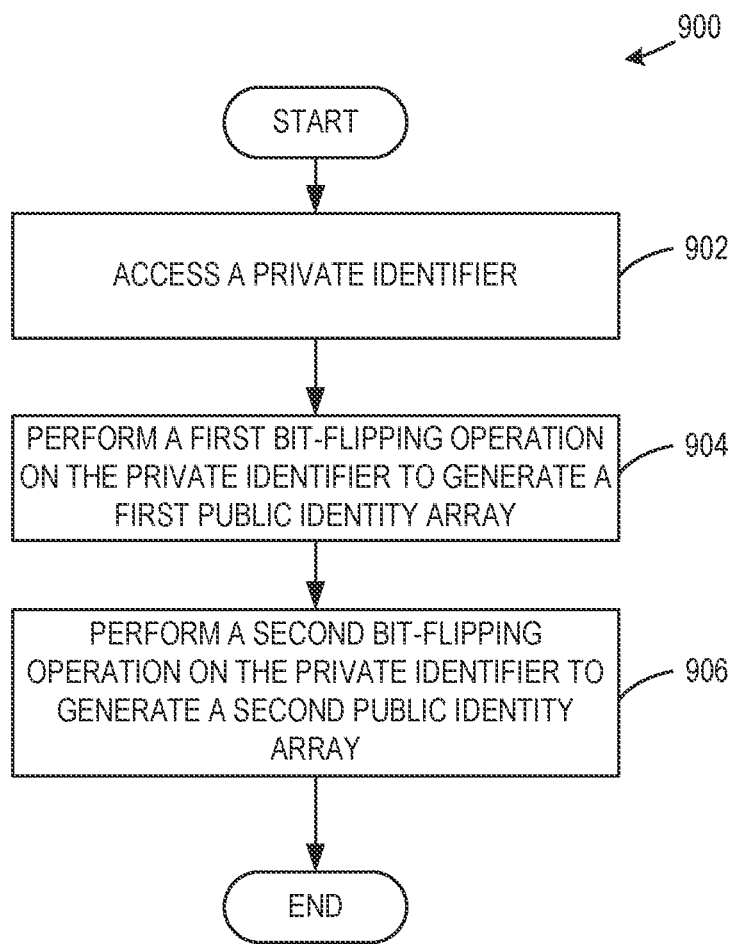
FIG. 9 is a flowchart representative of example machine readable instructions and/or example operations that may be executed and/or instantiated by processor circuitry to implement example array generation circuitry to process public array information.

FIG. 9 is a flowchart representative of example machine readable instructions and/or example operations 900 that may be executed and/or instantiated by processor circuitry to implement the client device 108A (FIG. 2) to process public array information. The example machine readable instructions and/or operations 900 of FIG. 9 begin at block 902, at which the example array generation circuitry 214 of FIG. 2 accesses a private identifier. For example, the array generation circuitry 214 of FIG. 2 may access a location in memory (e.g., a memory location of the client device 108A of FIG. 2). At block 904, the example bit flip circuitry 216 of FIG. 2 performs a first bit-flipping operation on the private identifier to generate a first public identity array. For example, the bit flip circuitry 216 of FIG. 2 may probabilistically flip bits of the private identifier (e.g., flip bits on a copy of the private identifier without destroying the private identifier) based on a bit-flipping probability distribution. Such an operation may generate a first public identity array (e.g., one of the public identity array 122A-C of FIG. 1). At block 906, the example bit flip circuitry 216 of FIG. 2 performs a second bit-flipping operation on the private identifier to generate a second public identity array. For example, the bit flip circuitry 216 of FIG. 2 may probabilistically flip bits of the private identifier based on a bit-flipping probability distribution to generate a second public identifier that is distinct from the first public identifier. Such an operation may generate a second public identity array (e.g., a second one of the public identity array 122A-C of FIG. 1) to be sent to the database proprietor 130A and/or the AME 102. The example instructions 900 of FIG. 9 end.

Figure 10:
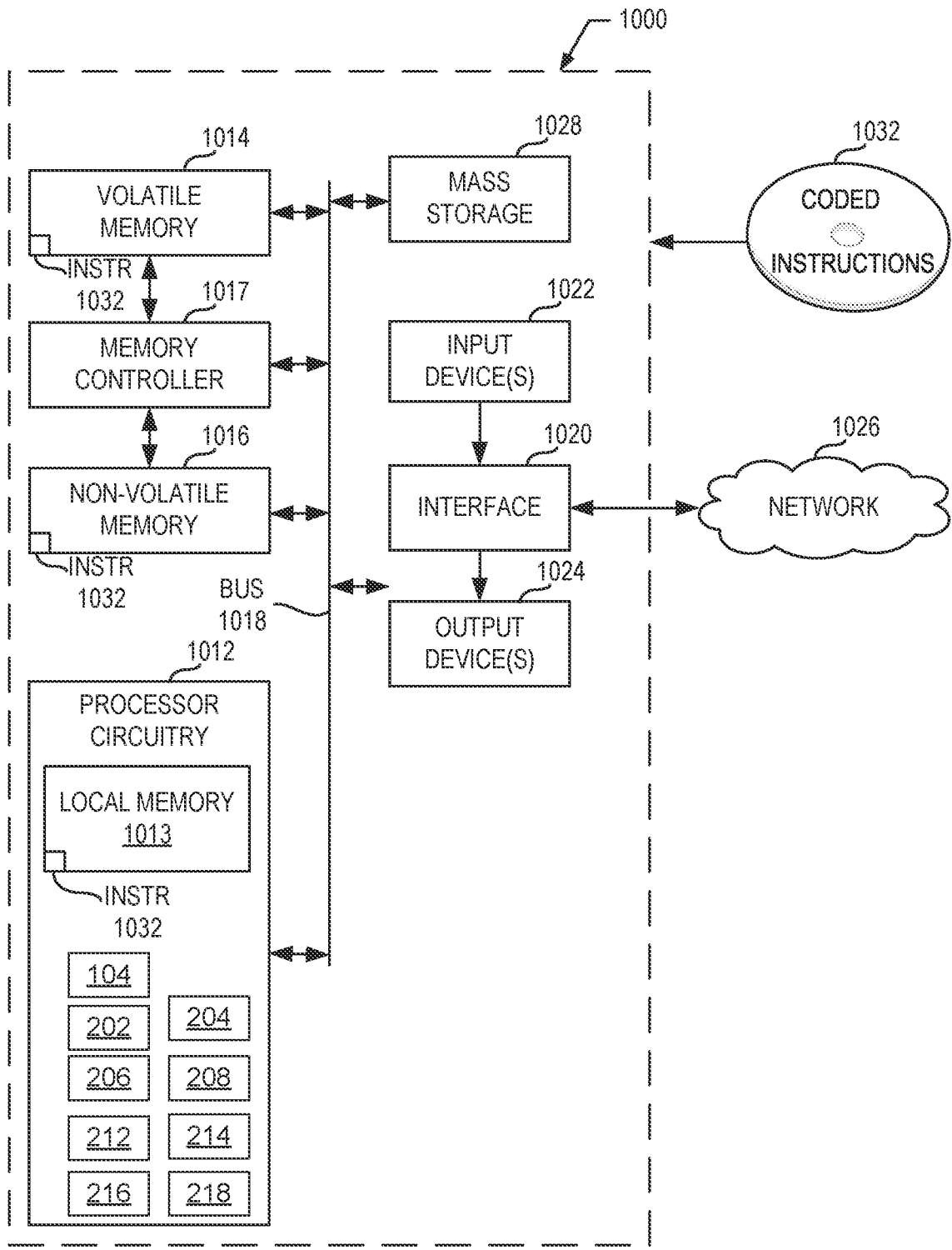
FIG. 10 is a block diagram of an example processor platform structured to execute and/or instantiate the machine readable instructions and/or operations of FIG. 9 to implement the example client device of FIG. 2.

FIG. 10 is a block diagram of an example processor platform 1000 structured to execute and/or instantiate the machine readable instructions and/or operations of FIG. 9 to implement the example client device 108A of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example browser 202, the example first app 204, the example second app 206, the example third app 208, the example identity generation circuitry 104, the example first network interface circuitry 212, the example array generation circuitry 214, the example bit flip circuitry 216, and the example distribution selection circuitry 218.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a keyboard, a button, a mouse, a touchscreen, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIG. 9, may be stored in the mass storage device 1028, in the volatile memory 1014, in the non-volatile memory 1016, and/or on a removable non-transitory computer readable storage medium such as a CD or DVD.

Figure 11:
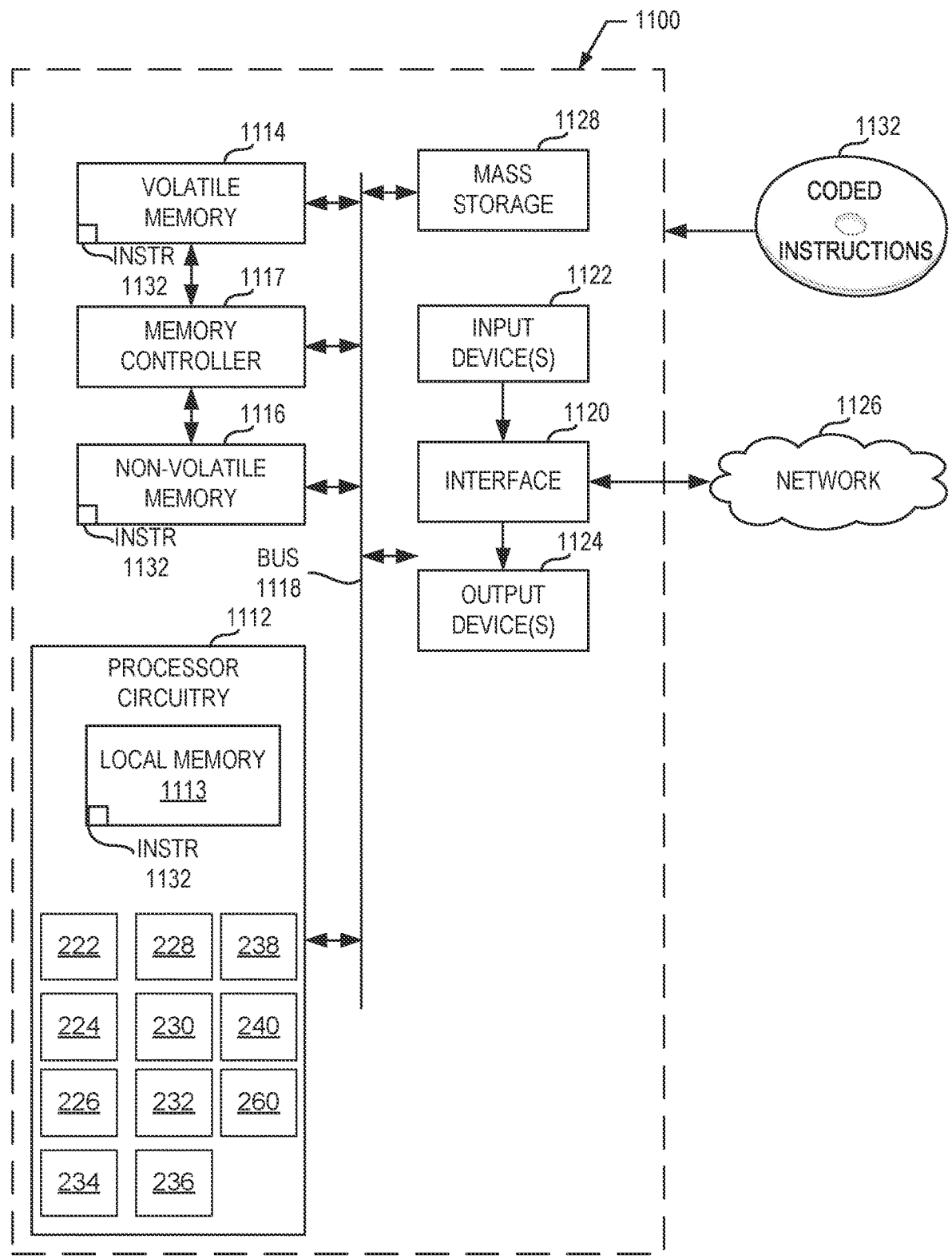
FIG. 11 is a block diagram of an example processor platform structured to execute and/or instantiate the machine readable instructions and/or operations of FIGS. 4-7 to implement the example audience measurement entity of FIG. 2.

FIG. 11 is a block diagram of an example processor platform 1100 structured to execute and/or instantiate the machine readable instructions and/or operations of FIGS. 4-7 to implement a server, a computer, or apparatus of the example audience measurement entity 102 of FIG. 2. The processor platform 1100 can be, for example, a server, a personal computer, a workstation, a self-learning machine (e.g., a neural network), or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example cardinality estimation circuitry 222, the example public array aggregation circuitry 224, the example mean center circuitry 226, the example bit-level operation circuitry 228, the example point estimation circuitry 230, the example bound determination circuitry 232, the example audience metrics generation circuitry 234, the example second network interface circuitry 236, the example audience size estimation circuitry 238, and the example AME database management circuitry 260.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a keyboard, a button, a mouse, a touchscreen, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIGS. 4-7, may be stored in the mass storage device 1128, in the volatile memory 1114, in the non-volatile memory 1116, and/or on a removable non-transitory computer readable storage medium such as a CD or DVD.

Figure 12:
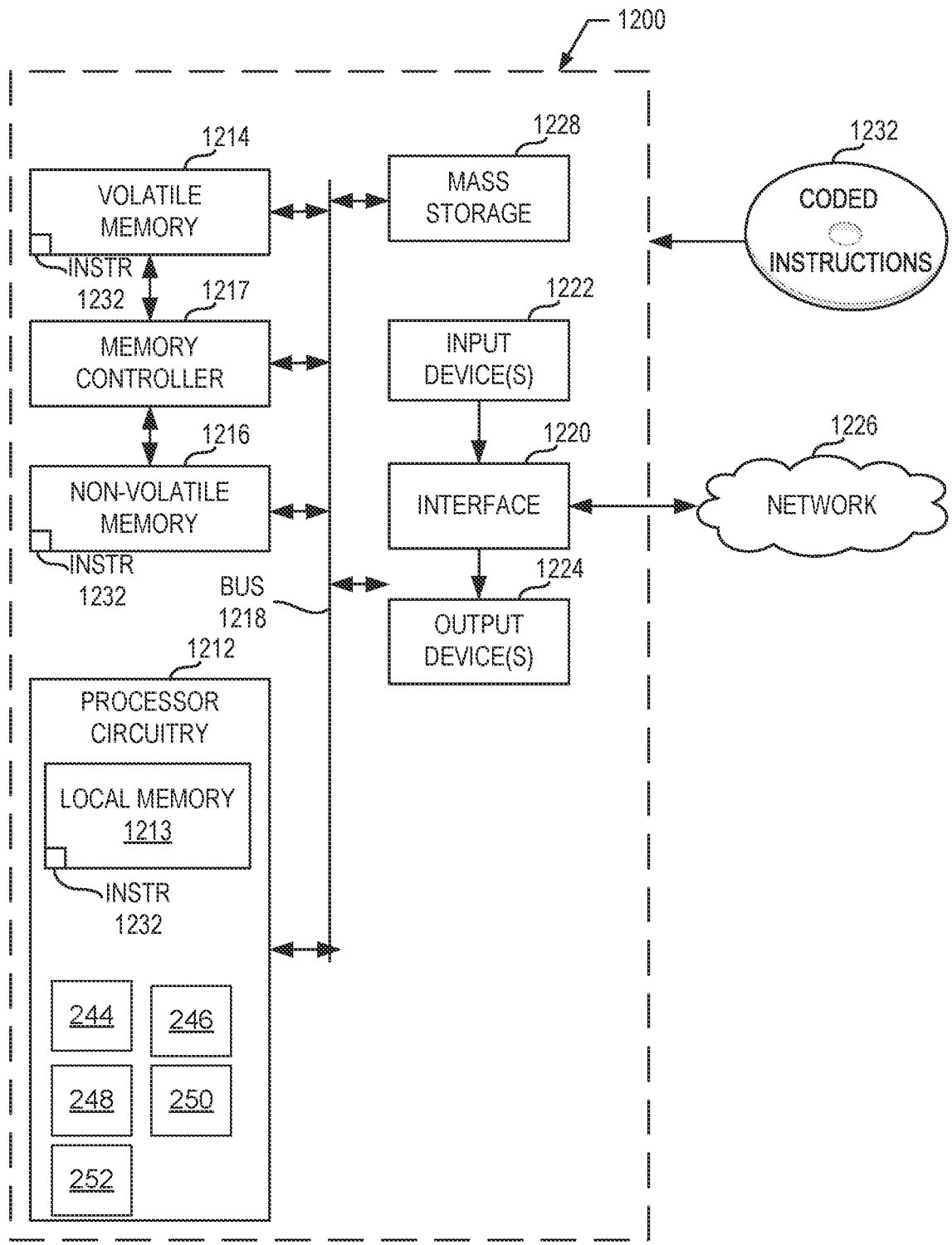
FIG. 12 is a block diagram of an example processor platform structured to execute and/or instantiate the machine readable instructions and/or operations of FIG. 8 to implement the example database proprietor of FIG. 2.

FIG. 12 is a block diagram of an example processor platform 1200 structured to execute and/or instantiate the machine readable instructions and/or operations of FIG. 8 to implement an example server, computer, or apparatus of the example database proprietor 130A of FIG. 2. The processor platform 1200 can be, for example, a server, a personal computer, a workstation, a self-learning machine (e.g., a neural network), or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements, the example public array aggregation circuitry 244, the example bitwise operator circuitry 246, the example third network interface circuitry 248, the example distribution generation circuitry 250, the example database management circuitry 252, The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a keyboard, a button, a mouse, a touchscreen, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine readable instructions of FIG. 8, may be stored in the mass storage device 1228, in the volatile memory 1214, in the non-volatile memory 1216, and/or on a removable non-transitory computer readable storage medium such as a CD or DVD.

Figure 13:
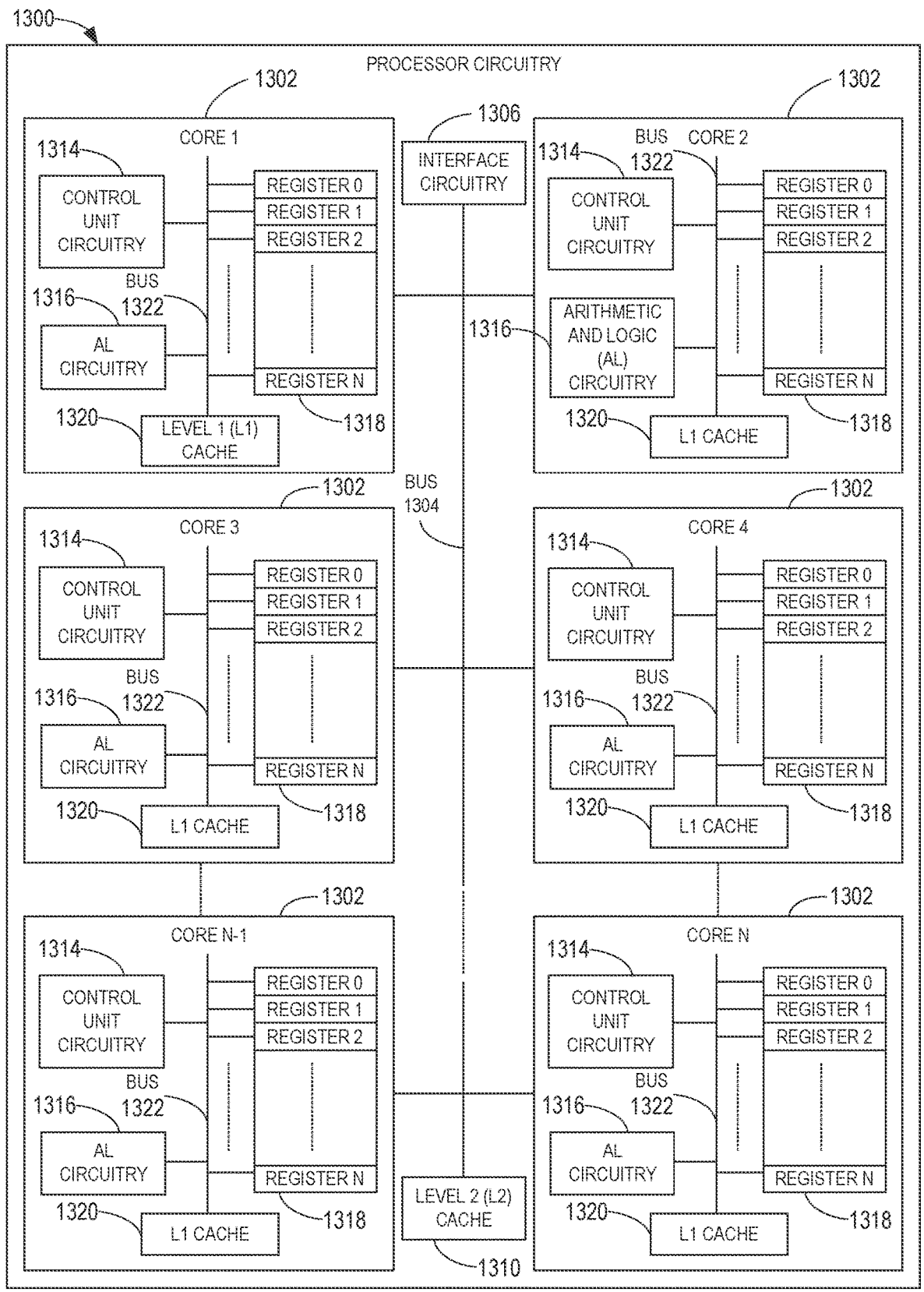
FIG. 13 is a block diagram of an example implementation of the processor circuitry of FIGS. 10-12.

FIG. 13 is a block diagram of an example implementation of the processor circuitry 1012, 1112, 1212 of FIGS. 10-12. In this example, the processor circuitry 1012, 1112, 1212 of FIGS. 10-12 is implemented by a microprocessor 1300. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 4-9.

The cores 1302 may communicate by an example bus 1304. In some examples, the bus 1304 may implement a communication bus to effectuate communication associated with one(s) of the cores 1302. For example, the bus 1304 may implement at least one of an Inter-Integrated Circuit (I2C) bus, a Serial Peripheral Interface (SPI) bus, a PCI bus, or a PCIe bus. Additionally or alternatively, the bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1014, 1016 of FIG. 10, the main memory 1114, 1116 of FIG. 11, the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and an example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The bus 1320 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
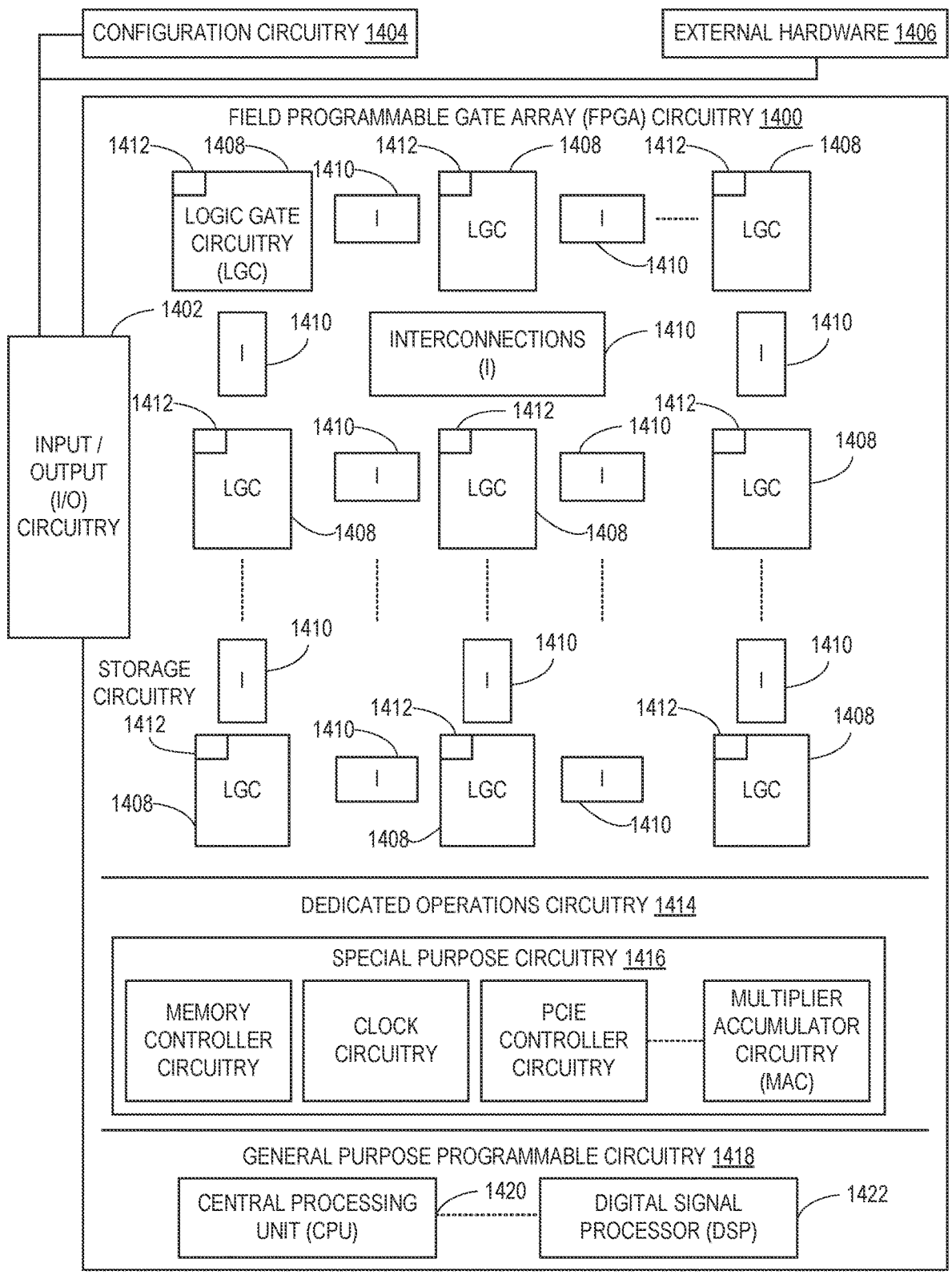
FIG. 14 is a block diagram of another example implementation of the processor circuitry of FIGS. 10-12.

FIG. 14 is a block diagram of another example implementation of the processor circuitry 1012, 1112, 1212 of FIGS. 10-12. In this example, the processor circuitry 1012, 1112, 1212 of FIGS. 10-12 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowchart of FIGS. 4-9 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 4-9. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowchart of FIGS. 4-9. As such, the FPGA circuitry 1400 may be structured to effectively instantiate some or all of the machine readable instructions of the flowchart of FIGS. 4-9 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 4-9 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 4-9 and/or other desired operations. The logic gate circuitry 1408 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1012 of FIG. 10, 1112 of FIG. 11, and/or 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1012, 1112, 1212 of FIGS.

10-12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 4-9 may be executed by one or more of the cores 1302 of FIG. 13 and a second portion of the machine readable instructions represented by the flowchart of FIGS. 4-9 may be executed by the FPGA circuitry 1400 of FIG. 14.

In some examples, the processor circuitry 1012, 1112, 1212 of FIGS. 10-12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1012, 1112, 1212 of FIGS. 10-12, which may be in one or more packages. For example, the XPU may include a CPU in one package, a DSP in another package, a GPU in yet another package, and an FPGA in still yet another package.

Figure 15:
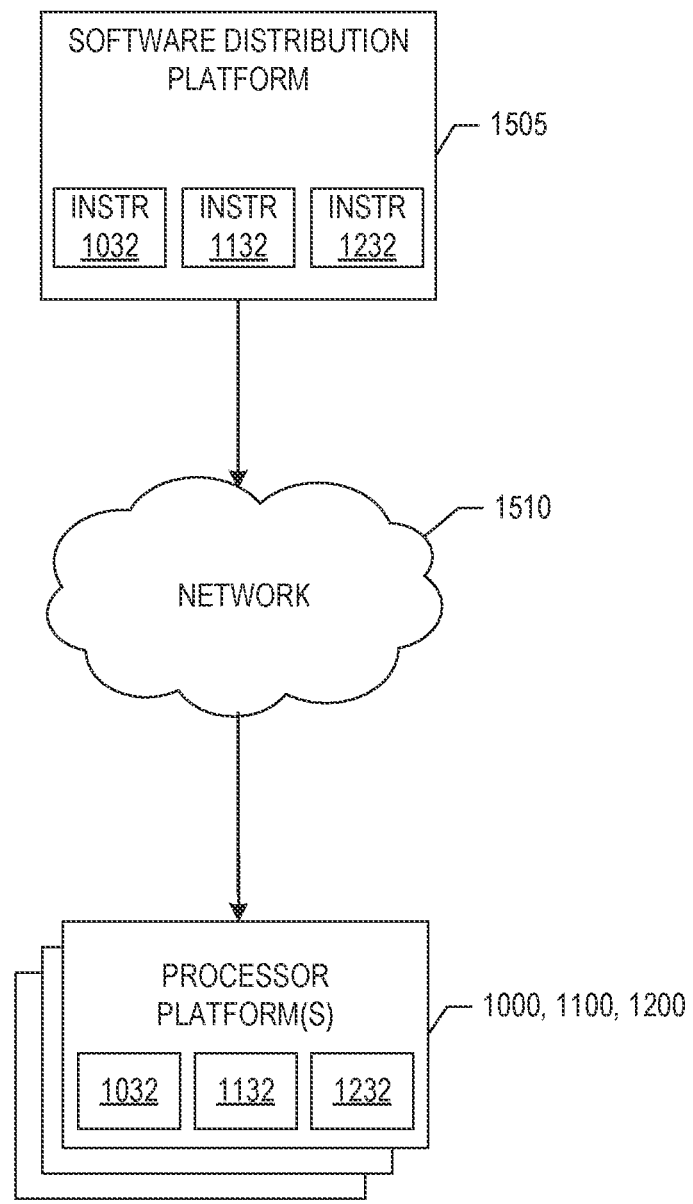
FIG. 15 is a block diagram of an example software distribution platform (e.g., one or more servers) to distribute software (e.g., software corresponding to the example machine readable instructions of FIGS. 4-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1032, 1132, 1232 of FIGS. 10-12 to hardware devices owned and/or operated by third parties is illustrated in FIG. 15 The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1032, 1132, 1232 of FIGS. 10-12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1032, 1132, 1232 of FIGS. 10-12, which may correspond to the example machine readable instructions of FIGS. 4-9, as described above. The one or more servers of the example software distribution platform 1505 are in communication with a network 1510, which may correspond to any one or more of the Internet and/or any of the example networks (e.g., the network 220) described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1532 from the software distribution platform 1505. For example, the software, which may correspond to the example machine readable instructions 1032, 1132, 1232 of FIGS. 10-12, may be downloaded to the example processor platform 1000, 1100, 1200 which is to execute the machine readable instructions 1032, 1132, 1232 of FIGS. 10-12 to implement the example client device 108A, the example AME 102, and/or the example database proprietor 130A. In some examples, one or more servers of the software distribution platform 1505 periodically offer, transmit, and/or force updates to the software (e.g., the example machine readable instructions 1032, 1132, 1232 of FIGS. 10-12) to ensure improvements, patches, updates, etc., are distributed and applied to the software at the end user devices.

From the foregoing, it will be appreciated that example systems, methods, apparatus, and articles of manufacture have been disclosed that estimate unique audience sizes across multiple intersecting platforms. The disclosed systems, methods, apparatus, and articles of manufacture improve the efficiency of using computing device totals by substantially reducing or eliminating the double counting of individual audience members that were exposed to media via more than one platform and/or are represented in more than one database of media impressions used to determine the reach of the media. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to estimate unique audience sizes across multiple intersecting platforms are disclosed herein. Further examples and combinations thereof include the following:

Example 1 includes an apparatus comprising at least one memory, instructions, and processor circuitry to execute the instructions to at least determine a first sum of estimated individual cardinalities of audience members of first and second media platforms, determine a second sum of estimated pairwise cardinalities of ones of the audience members belonging to both the first and second media platforms, generate lower and upper bound estimates of a deduplicated audience size based on the first and second sums, and send the deduplicated audience size to a computing device via a network communication.

Example 2 includes the apparatus of example 1, wherein the processor circuitry is to execute the instructions to generate a point estimate of the deduplicated audience size based on a weighted average of extremes of the lower and upper bound estimates.

Example 3 includes the apparatus of example 1, wherein the processor circuitry is to execute the instructions to estimate a first individual cardinality, the first individual cardinality to represent non-duplicated audience members of the first media platform, and estimate a second individual cardinality, the second individual cardinality to represent non-duplicated audience members of the second media platform, the first sum of estimated individual cardinalities based on the first individual cardinality and the second individual cardinality.

Example 4 includes the apparatus of example 3, wherein the processor circuitry is to execute the instructions to determine the first sum of estimated individual cardinalities by aggregating the first and second individual cardinalities.

Example 5 includes the apparatus of example 1, wherein the processor circuitry is to execute the instructions to generate a first bit flipping probability distribution to facilitate private sharing of information between the first media platform and the audience members of the first media platform.

Example 6 includes the apparatus of example 5, wherein the processor circuitry is to execute the instructions to generate a second bit flipping probability distribution, the second bit flipping probability distribution to share an expected value with the first bit flipping probability distribution, the second bit flipping probability distribution to facilitate private sharing of information between the second media platform and the audience members of the second media platform.

Example 7 includes the apparatus of example 1, wherein the first media platform is accessible via at least one of a website, an application, or a media streaming service.

Example 8 includes an apparatus comprising at least one memory, instructions in the apparatus, and processor circuitry to execute the instructions to access a private identifier, the private identifier to identify an audience member, perform a first bit-flipping operation based on the private identifier to generate a first public identity array to identify the audience member to a first media platform, the first bit-flipping operation to bit-flip first ones of bits of the private identifier, and perform a second bit-flipping operation based on the private identifier to generate a second public identity array to identify the audience member to a second media platform, the second bit-flipping operation to bit-flip second ones of the bits of the private identifier.

Example 9 includes the apparatus of example 8, wherein the processor circuitry is to execute the instructions to generate a bit-flipping probability distribution, the first and second bit-flipping operations based on the bit-flipping probability distribution.

Example 10 includes the apparatus of example 9, wherein the processor circuitry is to execute the instructions to vary the bit-flipping probability distribution on a bit-by-bit basis.

Example 11 includes the apparatus of example 8, wherein the processor circuitry is to execute the instructions to receive a bit-flipping probability distribution from the first media platform, the first and second bit-flipping operations based on the bit-flipping probability distribution.

Example 12 includes the apparatus of example 8, wherein the processor circuitry is to execute the instructions to provide the public identifier to the first media platform.

Example 13 includes the apparatus of example 8, wherein the length of the private identifier is based on an audience size of the first media platform.

Example 14 includes a non-transitory computer readable medium comprising instructions, which, when executed, cause processor circuitry to at least determine a first sum of estimated individual cardinalities of audience members of first and second media platforms, determine a second sum of estimated pairwise cardinalities of ones of the audience members belonging to both the first and second media platforms, generate lower and upper bound estimates of a deduplicated audience size based on the first and second sums, and send the deduplicated audience size to a computing device via a network communication.

Example 15 includes the non-transitory computer readable medium of example 14, wherein the instructions, when executed, cause the processor circuitry to generate a point estimate of the deduplicated audience size based on a weighted average of extremes of the lower and upper bound estimates.

Example 16 includes the non-transitory computer readable medium of example 14, wherein the instructions, when executed, cause the processor circuitry to estimate a first individual cardinality, the first individual cardinality to represent non-duplicated audience members of the first media platform, and estimate a second individual cardinality, the second individual cardinality to represent non-duplicated audience members of the second media platform, the first sum of estimated individual cardinalities based on the first individual cardinality and the second individual cardinality.

Example 17 includes the non-transitory computer readable medium of example 16, wherein the instructions, when executed, cause the processor circuitry to determine the first sum of estimated individual cardinalities by aggregating the first and second individual cardinalities.

Example 18 includes the non-transitory computer readable medium of example 14, wherein the instructions, when executed, cause the processor circuitry to generate a first bit flipping probability distribution to facilitate private sharing of information between the first media platform and the audience members of the first media platform.

Example 19 includes the non-transitory computer readable medium of example 18, wherein the instructions, when executed, cause the processor circuitry to generate a second bit flipping probability distribution, the second bit flipping probability distribution to share an expected value with the first bit flipping probability distribution, the second bit flipping probability distribution to facilitate private sharing of information between the second media platform and the audience members of the second media platform.

Example 20 includes the non-transitory computer readable medium of example 14, wherein the first media platform is accessible via at least one of a website, an application, or a media streaming service.

Example 21 includes a non-transitory computer readable medium comprising instructions, which, when executed, cause processor circuitry to at least access a private identifier, the private identifier to identify an audience member, perform a first bit-flipping operation based on the private identifier to generate a first public identity array to identify the audience member to a first media platform, the first bit-flipping operation to bit-flip first ones of bits of the private identifier, and perform a second bit-flipping operation based on the private identifier to generate a second public identity array to identify the audience member to a second media platform, the second bit-flipping operation to bit-flip second ones of the bits of the private identifier.

Example 22 includes the non-transitory computer readable medium of example 21, wherein the instructions, when executed, cause the processor circuitry to generate a bit-flipping probability distribution, the first and second bit-flipping operations based on the bit-flipping probability distribution.

Example 23 includes the non-transitory computer readable medium of example 22, wherein the instructions, when executed, cause the processor circuitry to vary the bit-flipping probability distribution on a bit-by-bit basis.

Example 24 includes the non-transitory computer readable medium of example 21, wherein the instructions, when executed, cause the processor circuitry to receive a bit-flipping probability distribution from the first media platform, the first and second bit-flipping operations based on the bit-flipping probability distribution.

Example 25 includes the non-transitory computer readable medium of example 21, wherein the instructions, when executed, cause the processor circuitry to provide the public identifier to the first media platform.

Example 26 includes the non-transitory computer readable medium of example 21, wherein the length of the private identifier is based on an audience size of the first media platform.

Example 27 includes a method comprising determining, by executing an instruction with processor circuitry, a first sum of estimated individual cardinalities of audience members of first and second media platforms, determining, by executing an instruction with the processor circuitry, a second sum of estimated pairwise cardinalities of ones of the audience members belonging to both the first and second media platforms, generating, by executing an instruction with the processor circuitry, lower and upper bound estimates of a deduplicated audience size based on the first and second sums, and sending, by executing an instruction with the processor circuitry, the deduplicated audience size to a computing device via a network communication.

Example 28 includes the method of example 27, further including generating a point estimate of the deduplicated audience size based on a weighted average of extremes of the lower and upper bound estimates.

Example 29 includes the method of example 27, further including estimating a first individual cardinality, the first individual cardinality to represent non-duplicated audience members of the first media platform, and estimating a second individual cardinality, the second individual cardinality to represent non-duplicated audience members of the second media platform, the first sum of estimated individual cardinalities based on the first individual cardinality and the second individual cardinality.

Example 30 includes the method of example 29, further including determining the first sum of estimated individual cardinalities by aggregating the first and second individual cardinalities.

Example 31 includes the method of example 27, further including generating a first bit flipping probability distribution to facilitate private sharing of information between the first media platform and the audience members of the first media platform.

Example 32 includes the method of example 31, further including generating a second bit flipping probability distribution, the second bit flipping probability distribution to share an expected value with the first bit flipping probability distribution, the second bit flipping probability distribution to facilitate private sharing of information between the second media platform and the audience members of the second media platform.

Example 33 includes the method of example 27, wherein the first media platform is accessible via at least one of a website, an application, or a media streaming service.

Example 34 includes a method comprising accessing, by executing an instruction with processor circuitry, a private identifier, the private identifier to identify an audience member, performing, by executing an instruction with the processor circuitry, a first bit-flipping operation based on the private identifier to generate a first public identity array to identify the audience member to a first media platform, the first bit-flipping operation to bit-flip first ones of bits of the private identifier, and performing, by executing an instruction with the processor circuitry, a second bit-flipping operation based on the private identifier to generate a second public identity array to identify the audience member to a second media platform, the second bit-flipping operation to bit-flip second ones of the bits of the private identifier.

Example 35 includes the method of example 34, further including generating a bit-flipping probability distribution, the first and second bit-flipping operations based on the bit-flipping probability distribution.

Example 36 includes the method of example 35, further including varying the bit-flipping probability distribution on a bit-by-bit basis.

Example 37 includes the method of example 34, further including receiving a bit-flipping probability distribution from the first media platform, the first and second bit-flipping operations based on the bit-flipping probability distribution.

Example 38 includes the method of example 34, further including providing the public identifier to the first media platform.

Example 39 includes the method of example 34, wherein the length of the private identifier is based on an audience size of the first media platform.

Example 40 includes an apparatus to estimate unique audience sizes across multiple intersecting platforms, the apparatus comprising means for determining sums of estimated cardinalities of audience members to determine a first sum of estimated individual cardinalities of the audience members of first and second media platforms, and determine a second sum of estimated pairwise cardinalities of ones of the audience members belonging to both the first and second media platforms, means for generating lower and upper bound estimates of a deduplicated audience size based on the first and second sums, and means for sending the deduplicated audience size to a computing device via a network communication.

Example 41 includes the apparatus of example 40, further including means for generating a point estimate of the deduplicated audience size based on a weighted average of extremes of the lower and upper bound estimates.

Example 42 includes the apparatus of example 40, wherein the means for determining sums of estimated cardinalities is to estimate a first individual cardinality, the first individual cardinality to represent non-duplicated audience members of the first media platform, and estimate a second individual cardinality, the second individual cardinality to represent non-duplicated audience members of the second media platform, the first sum of estimated individual cardinalities based on the first individual cardinality and the second individual cardinality.

Example 43 includes the apparatus of example 42, wherein the means for determining sums of estimated cardinalities is to determine the first sum of estimated individual cardinalities by aggregating the first and second individual cardinalities.

Example 44 includes the apparatus of example 40, further including means for generating a first bit flipping probability distribution to facilitate private sharing of information between the first media platform and the audience members of the first media platform.

Example 45 includes the apparatus of example 44, wherein the means for generating the first bit flipping probability distribution is to generate a second bit flipping probability distribution, the second bit flipping probability distribution to share an expected value with the first bit flipping probability distribution, the second bit flipping probability distribution to facilitate private sharing of information between the second media platform and the audience members of the second media platform.

Example 46 includes the apparatus of example 40, wherein the first media platform is accessible via at least one of a website, an application, or a media streaming service.

Example 47 includes an apparatus to estimate unique audience sizes across multiple intersecting platforms, the apparatus comprising means for accessing a private identifier, the private identifier to identify an audience member, and means for performing bit-flipping operations to perform a first bit-flipping operation based on the private identifier to generate a first public identity array to identify the audience member to a first media platform, the first bit-flipping operation to bit-flip first ones of bits of the private identifier, and perform a second bit-flipping operation based on the private identifier to generate a second public identity array to identify the audience member to a second media platform, the second bit-flipping operation to bit-flip second ones of the bits of the private identifier.

Example 48 includes the apparatus of example 47, further including means for generating a bit-flipping probability distribution, the first and second bit-flipping operations based on the bit-flipping probability distribution.

Example 49 includes the apparatus of example 48, wherein the means for generating the bit-flipping probability distribution is to vary the bit-flipping probability distribution on a bit-by-bit basis.

Example 50 includes the apparatus of example 47, further including means for receiving a bit-flipping probability distribution from the first media platform, the first and second bit-flipping operations based on the bit-flipping probability distribution.

Example 51 includes the apparatus of example 47, further including means for providing the public identifier to the first media platform.

Example 52 includes the apparatus of example 47, wherein the length of the private identifier is based on an audience size of the first media platform.

Example 53 includes an apparatus comprising at least one memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or application specific integrated circuitry including logic gate circuitry to perform one or more third operations, the processor circuitry to at least one of perform at least one of the first operations, the second operations or the third operations to access a private identifier, the private identifier to identify an audience member, perform a first bit-flipping operation based on the private identifier to generate a first public identity array to identify the audience member to a first media platform, the first bit-flipping operation to bit-flip first ones of bits of the private identifier, and perform a second bit-flipping operation based on the private identifier to generate a second public identity array to identify the audience member to a second media platform, the second bit-flipping operation to bit-flip second ones of the bits of the private identifier.

Example 54 includes an apparatus comprising at least one memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or application specific integrated circuitry including logic gate circuitry to perform one or more third operations, the processor circuitry to at least one of perform at least one of the first operations, the second operations or the third operations to determine a first sum of estimated individual cardinalities of audience members of first and second media platforms, determine a second sum of estimated pairwise cardinalities of ones of the audience members belonging to both the first and second media platforms, generate lower and upper bound estimates of a deduplicated audience size based on the first and second sums, and send the deduplicated audience size to a computing device via a network communication. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system comprising a processor and a memory, the computing system configured to perform a set of operations comprising:
presenting first media using a display of a mobile device, wherein the first media is distributed via a first media platform and is identified using a first media identifier, the first media platform at a first server of a first database proprietor;
determining a private identifier identifying the mobile device;
generating a private array using the private identifier;
accessing a bit-flipping probability distribution, wherein the bit-flipping probability distribution is received from the first media platform via a network communication;
generating a first public identity array by performing a first bit-flipping operation on the private array, wherein the first bit-flipping operation probabilistically bit-flips first bits of the private array based on the bit-flipping probability distribution;
transmitting the first media identifier and the first public identity array to the first media platform to inform the first media platform of the presenting of the first media;
logging, at the first server of the first database proprietor, first impressions based on the first public identity array, wherein logging the first impressions comprises:
identifying first subscriber accounts associated with the first public identity array;
retrieving first demographic information from first subscriber account records based on the first subscriber accounts; and
logging the first impressions based on the first media and the first demographic information;
presenting second media using the display of the mobile device, wherein the second media is distributed via a second media platform and is identified using a second media identifier, the second media platform at a second server of a second database proprietor;
generating a second public identity array by performing a second bit-flipping operation on the private array, wherein the second bit-flipping operation probabilistically bit-flips second bits of the private array based on the bit-flipping probability distribution;
logging, at the second server of the second database proprietor, second impressions based on the second public identity array, wherein logging the second impressions comprises:
identifying second subscriber accounts associated with the second public identity array;

retrieving second demographic information from second subscriber account records based on the second subscriber accounts; and logging the second impressions based on the second media and the second demographic information;

transmitting the second media identifier and the second public identity array to the second media platform to inform the second media platform of the presenting of the second media, wherein the second server of the second database proprietor does not have access to the first public identity array, and wherein the first server of the first database proprietor does not have access to the second public identity array;

transmitting, to at least one server of an audience measurement entity, impression requests for the first impressions of the first media and the second impressions of the second media, wherein the at least one server of the audience measurement entity is different than the first server or the second server;

logging, at the least one server of the audience measurement entity, census impressions based on the first impressions of the first media and the second impressions of the second media;

generating an nth public identity array by performing an nth bit-flipping operation on the private array, wherein the nth bit-flipping operation probabilistically bit-flips nth bits of the private array based on the bit-flipping probability distribution, wherein n is greater than or equal to one thousand (1000) subscribers;

logging, at the nth server of the nth database proprietor, nth impressions based on the nth public identity array, wherein logging the nth impressions comprises:
identifying nth subscriber accounts associated with the nth public identity array;
retrieving nth demographic information from nth subscriber account records based on the nth subscriber accounts; and
logging the nth impressions based on the nth media and the nth demographic information;

transmitting the nth media identifier and the nth public identity array to the nth media platform to inform the nth media platform of the presenting of the nth media, wherein the nth server of the nth database proprietor does not have access to the first public identity array or the second public identity array, further transmitting, to the at least one server of the audience measurement entity, additional impression requests for the nth impressions of the nth media, wherein the at least one server of the audience measurement entity is different than the first server, the second server, or any servers of the nth servers; and further logging, at the least one server of the audience measurement entity, the census impressions based on the first impressions of the first media, the second impressions of the second media, and the nth impressions of the nth media.

2. The computing system of claim 1, wherein the first media platform is configured to aggregate the first public identity array with other public identity arrays so as to generate an aggregated public identity array, and transmit the aggregated public identity array to the audience measurement entity for use in estimating a unique audience of the first media.

3. The computing system of claim 1, wherein a length of the private array is based on an audience size of the first media platform.

4. The computing system of claim 1, wherein:
the first media includes monitoring instructions, and
execution of the monitoring instructions causes the mobile device to generate the first public identity array and send the first public identity array to the first media platform.

5. The computing system of claim 1, wherein:
the first media is presented via first application, and
presenting the first media via the first application causes the mobile device to generate the first public identity array and send the first public identity array to the first media platform.

6. A method comprising:
presenting, by a mobile device using a display of the mobile device, first media, wherein the first media is distributed via a first media platform and is identified using a first media identifier, the first media platform at a first server of a first database proprietor;

determining, by the mobile device, a private identifier identifying the mobile device;

generating, by the mobile device, a private array using the private identifier;

accessing, by the mobile device, a bit-flipping probability distribution, wherein the bit-flipping probability distribution is received from the first media platform via a network communication;

generating, by the mobile device, a first public identity array by performing a first bit-flipping operation on the private array, wherein the first bit-flipping operation probabilistically bit-flips first bits of the private array based on the bit-flipping probability distribution;

transmitting, by the mobile device, the first media identifier and the first public identity array to the first media platform to inform the first media platform of the presenting of the first media;

logging, at the first server of the first database proprietor, first impressions based on the first public identity array, wherein logging the first impressions comprises:
identifying first subscriber accounts associated with the first public identity array;
retrieving first demographic information from first subscriber account records based on the first subscriber accounts; and
logging the first impressions based on the first media and the first demographic information;

presenting, by the mobile device using the display of the mobile device, second media, wherein the second media is distributed via a second media platform and is identified using a second media identifier, the second media platform at a second server of a second database proprietor;

generating, by the mobile device, a second public identity array by performing a second bit-flipping operation on the private array, wherein the second bit-flipping operation probabilistically bit-flips second bits of the private array based on the bit-flipping probability distribution;

logging, at the second server of the second database proprietor, second impressions based on the second public identity array, wherein logging the second impressions comprises:
identifying second subscriber accounts associated with the second public identity array;
retrieving second demographic information from second subscriber account records based on the second subscriber accounts; and
logging the second impressions based on the second media and the second demographic information;

transmitting, by the mobile device, the second media identifier and the second public identity array to the second media platform to inform the second media platform of the presenting of the second media, wherein the second server of the second database proprietor does not have access to the first public identity array, and wherein the first server of the first database proprietor does not have access to the second public identity array;

transmitting, to at least one server of an audience measurement entity, impression requests for the first impressions of the first media and the second impressions of the second media, wherein the at least one server of the audience measurement entity is different than the first server or the second server;

logging, at the least one server of the audience measurement entity, census impressions based on the first impressions of the first media and the second impressions of the second media;

generating an nth public identity array by performing an nth bit-flipping operation on the private array, wherein the nth bit-flipping operation probabilistically bit-flips nth bits of the private array based on the bit-flipping probability distribution, wherein n is greater than or equal to one thousand (1000) subscribers;

logging, at the nth server of the nth database proprietor, nth impressions based on the nth public identity array, wherein logging the nth impressions comprises:
identifying nth subscriber accounts associated with the nth public identity array;
retrieving nth demographic information from nth subscriber account records based on the nth subscriber accounts; and
logging the nth impressions based on the nth media and the nth demographic information;

transmitting the nth media identifier and the nth public identity array to the nth media platform to inform the nth media platform of the presenting of the nth media, wherein the nth server of the nth database proprietor does not have access to the first public identity array or the second public identity array, further transmitting, to the at least one server of the audience measurement entity, additional impression requests for the nth impressions of the nth media, wherein the at least one server of the audience measurement entity is different than the first server, the second server, or any servers of the nth servers; and further logging, at the least one server of the audience measurement entity, the census impressions based on the first impressions of the first media, the second impressions of the second media, and the nth impressions of the nth media.

7. The method of claim 6, wherein the first media platform is configured to aggregate the first public identity array with other public identity arrays so as to generate an aggregated public identity array, and transmit the aggregated public identity array to the audience measurement entity for use in estimating a unique audience of the first media.

8. The method of claim 6, wherein a length of the private array is based on an audience size of the first media platform.

9. The method of claim 6, wherein:
the first media includes monitoring instructions, and
execution of the monitoring instructions causes the mobile device to generate the first public identity array and send the first public identity array to the first media platform.

10. The method of claim 6, wherein:
the first media is presented via first application, and presenting the first media via the first application causes the mobile device to generate the first public identity array and send the first public identity array to the first media platform.

11. An audience measurement system comprising:
a mobile device comprising a processor and a memory, the mobile device configured to perform a first set of operations comprising:
presenting first media using a display of the mobile device, wherein the first media is distributed via a first media platform and is identified using a first media identifier, the first media platform at a first server of a first database proprietor,
determining a private identifier identifying the mobile device,
generating a private array using the private identifier,
accessing a bit-flipping probability distribution, wherein the bit-flipping probability distribution is received from the first media platform via a network communication,
generating a first public identity array by performing a first bit-flipping operation on the private array, wherein the first bit-flipping operation probabilistically bit-flips first bits of the private array based on the bit-flipping probability distribution,
transmitting the first media identifier and the first public identity array to the first media platform to inform the first media platform of the presenting of the first media,
presenting second media using the display of the mobile device, wherein the second media is distributed via a second media platform and is identified using a second media identifier, the second media platform at a second server of a second database proprietor,
generating a second public identity array by performing a second bit-flipping operation on the private array, wherein the second bit-flipping operation probabilistically bit-flips second bits of the private array based on the bit-flipping probability distribution,
transmitting the second media identifier and the second public identity array to the second media platform to inform the second media platform of the presenting of the second media, wherein the second server of the second database proprietor does not have access to the first public identity array, and wherein the first server of the first database proprietor does not have access to the second public identity array;
transmitting, to at least one server of an audience measurement entity, impression requests for the first impressions of the first media and the second impressions of the second media, wherein the at least one server of the audience measurement entity is different than the first server or the second server;
generating an nth public identity array by performing an nth bit-flipping operation on the private array, wherein the nth bit-flipping operation probabilistically bit-flips nth bits of the private array based on the bit-flipping probability distribution, wherein n is greater than or equal to one thousand (1000) subscribers;
transmitting the nth media identifier and the nth public identity array to the nth media platform to inform the nth media platform of the presenting of the nth media, wherein the nth server of the nth database proprietor does not have access to the first public identity array or the second public identity array, and
further transmitting, to the at least one server of the audience measurement entity, additional impression requests for the nth impressions of the nth media, wherein the at least one server of the audience measurement entity is different than the first server, the second server, or any servers of the nth servers;

the first server of the first database proprietor configured to perform a second set of operations comprising:
logging, at the first server of the first database proprietor, first impressions based on the first public identity array, wherein logging the first impressions comprises:
identifying first subscriber accounts associated with the first public identity array;
retrieving first demographic information from first subscriber account records based on the first subscriber accounts; and
logging the first impressions based on the first media and the first demographic information;

the second server of the second database proprietor configured to perform a third set of operations comprising:
logging, at the second server of the second database proprietor, second impressions based on the second public identity array, wherein logging the second impressions comprises:
identifying second subscriber accounts associated with the second public identity array;
retrieving second demographic information from second subscriber account records based on the second subscriber accounts; and
logging the second impressions based on the second media and the second demographic information; and the audience measurement entity configured to perform a fourth set of operations comprising:
receiving a first aggregated public identity array from the first media platform;
receiving a second aggregated public identity array from the second media platform;
estimating an audience cardinality across the first media platform and the second media platform using the first aggregated public identity array and the second aggregated public identity array; and
logging, at the least one server of the audience measurement entity, census impressions based on the first impressions of the first media and the second impressions of the second media; and the nth server of an nth database proprietor configured to perform an nth set of operations comprising
logging, at the nth server of the nth database proprietor, nth impressions based on the nth public identity array, wherein logging the nth impressions comprises:
identifying nth subscriber accounts associated with the nth public identity array;
retrieving nth demographic information from nth subscriber account records based on the nth subscriber accounts; and
logging the nth impressions based on the nth media and the nth demographic information; and
logging, at the least one server of the audience measurement entity, the census impressions based on the first impressions of the first media, the second impressions of the second media, and the nth impressions of the nth media.

12. The audience measurement system of claim 11, wherein the first media platform is configured to aggregate the first public identity array with other public identity arrays so as to generate an aggregated public identity array, and transmit the aggregated public identity array to the audience measurement entity for use in estimating a unique audience of the first media.

13. The audience measurement system of claim 11, wherein a length of the private array is based on an audience size of the first media platform.

14. The audience measurement system of claim 11, wherein:
the first media includes monitoring instructions, and
execution of the monitoring instructions causes the mobile device to generate the first public identity array and send the first public identity array to the first media platform.

15. The audience measurement system of claim 11, wherein:
the first media is presented via first application, and
presenting the first media via the first application causes the mobile device to generate the first public identity array and send the first public identity array to the first media platform.

16. The computing system of claim 1, the operations further comprising:
generating a third public identity array by performing a third bit-flipping operation on the private array, wherein the third bit-flipping operation probabilistically bit-flips third bits of the private array based on the bit-flipping probability distribution; and
logging, at the third server of the third database proprietor, third impressions based on the third public identity array, wherein logging the third impressions comprises:
identifying third subscriber accounts associated with the third public identity array;
retrieving third demographic information from third subscriber account records based on the third subscriber accounts; and
logging the third impressions based on the third media and the third demographic information;
transmitting the third media identifier and the third public identity array to the third media platform to inform the third media platform of the presenting of the third media, wherein the third server of the third database proprietor does not have access to the first public identity array or the second public identity array, and further transmitting, to the at least one server of an audience measurement entity, second impression requests for the third impressions of the third media, wherein the at least one server of the audience measurement entity is different than the first server, the second server, or the third server; and
further logging, at the least one server of the audience measurement entity, the census impressions based on the first impressions of the first media, the second impressions of the second media, and the third impressions of the third media.

17. The computing system of claim 16, the operations further comprising:
generating a fourth public identity array by performing a fourth bit-flipping operation on the private array, wherein the fourth bit-flipping operation probabilistically bit-flips fourth bits of the private array based on the bit-flipping probability distribution; and logging, at the fourth server of the fourth database proprietor, fourth impressions based on the fourth public identity array, wherein logging the fourth impressions comprises:
  identifying fourth subscriber accounts associated with the fourth public identity array;
  retrieving fourth demographic information from fourth subscriber account records based on the fourth subscriber accounts; and
  logging the fourth impressions based on the fourth media and the fourth demographic information;
transmitting the fourth media identifier and the fourth public identity array to the fourth media platform to inform the fourth media platform of the presenting of the fourth media, wherein the fourth server of the fourth database proprietor does not have access to the first public identity array, the second public identity array, or the third public identity array, and
further transmitting, to the at least one server of an audience measurement entity, third impression requests for the fourth impressions of the fourth media, wherein the at least one server of the audience measurement entity is different than the first server, the second server, the third server, or the fourth server; and
further logging, at the least one server of the audience measurement entity, the census impressions based on the first impressions of the first media, the second impressions of the second media, the third impressions of the third media, and the fourth impressions of the fourth media.

18. The computing system of claim 17, the operations further comprising:
  generating a fifth public identity array by performing a fifth bit-flipping operation on the private array, wherein the fifth bit-flipping operation probabilistically bit-flips fifth bits of the private array based on the bit-flipping probability distribution; and
  logging, at the fifth server of the fifth database proprietor, fifth impressions based on the fifth public identity array, wherein logging the fifth impressions comprises:
    identifying fifth subscriber accounts associated with the fifth public identity array;
    retrieving fifth demographic information from fifth subscriber account records based on the fifth subscriber accounts; and
    logging the fifth impressions based on the fifth media and the fifth demographic information;
  transmitting the fifth media identifier and the fifth public identity array to the fifth media platform to inform the fifth media platform of the presenting of the fifth media, wherein the fifth server of the fifth database proprietor does not have access to the first public identity array, the second public identity array, the third public identity array, or the fourth public identity array, and
  further transmitting, to the at least one server of an audience measurement entity, fourth impression requests for the fifth impressions of the fifth media, wherein the at least one server of the audience measurement entity is different than the first server, the second server, the third server, or the fourth server, or the fifth server; and
  further logging, at the least one server of the audience measurement entity, the census impressions based on the first impressions of the first media, the second impressions of the second media, the third impressions of the third media, the fourth impressions of the fourth media, and the fifth impressions of the fifth media.

19. The computing system of claim 18, the operations further comprising:
  generating a sixth public identity array by performing a sixth bit-flipping operation on the private array, wherein the sixth bit-flipping operation probabilistically bit-flips sixth bits of the private array based on the bit-flipping probability distribution; and
  logging, at the sixth server of the sixth database proprietor, sixth impressions based on the sixth public identity array, wherein logging the sixth impressions comprises:
    identifying sixth subscriber accounts associated with the sixth public identity array;
    retrieving sixth demographic information from sixth subscriber account records based on the sixth subscriber accounts; and
    logging the sixth impressions based on the sixth media and the sixth demographic information;
  transmitting the sixth media identifier and the sixth public identity array to the sixth media platform to inform the sixth media platform of the presenting of the sixth media, wherein the sixth server of the sixth database proprietor does not have access to the first public identity array, the second public identity array, the third public identity array, the fourth public identity array, or the fifth public identity array, and
  further transmitting, to the at least one server of an audience measurement entity, fifth impression requests for the sixth impressions of the sixth media, wherein the at least one server of the audience measurement entity is different than the first server, the second server, the third server, or the fourth server, the fifth server, or the sixth server; and
  further logging, at the least one server of the audience measurement entity, the census impressions based on the first impressions of the first media, the second impressions of the second media, the third impressions of the third media, the fourth impressions of the fourth media, the fifth impressions of the fifth media, and the sixth impressions of the sixth media.

* * * * *